(12) United States Patent
Ruybal et al.

(10) Patent No.: US 10,632,989 B2
(45) Date of Patent: Apr. 28, 2020

(54) SYSTEM AND METHOD FOR OPERATING A VEHICLE POWERTRAIN

(71) Applicant: Ford Global Technologies, LLC, Dearborn, MI (US)

(72) Inventors: Kevin Ray Ruybal, Canton, MI (US); Jason Meyer, Canton, MI (US); Jeffrey Allen Doering, Canton, MI (US); Walt Joseph Ortmann, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 175 days.

(21) Appl. No.: 15/619,136

(22) Filed: Jun. 9, 2017

(65) Prior Publication Data
US 2018/0354496 A1    Dec. 13, 2018

(51) Int. Cl.
*B60W 10/08*    (2006.01)
*B60W 20/40*    (2016.01)
(Continued)

(52) U.S. Cl.
CPC .............. *B60W 20/40* (2013.01); *B60K 6/387* (2013.01); *B60K 6/547* (2013.01); *B60W 10/02* (2013.01);
(Continued)

(58) Field of Classification Search
CPC ...... B60W 20/40; B60W 10/02; B60W 10/08; B60W 10/11; B60W 2510/0275; B60W 2510/0283; B60W 2510/1015; B60W 2510/104; B60W 2710/027; B60W 2710/028; B60W 2710/081; B60W 2720/10; F16H 63/50; F16H 63/486; F16H 63/48; F16H 61/688; F16H 61/686; F16H 63/483; F16H 2200/2046;
(Continued)

(56) References Cited

U.S. PATENT DOCUMENTS 6,845,305 B1    1/2005  Raftari et al.
6,962,551 B1    11/2005 Genise et al.
(Continued)

FOREIGN PATENT DOCUMENTS

| DE | 10113700 A1 | 9/2002 |
| DE | 10342949 A1 | 4/2005 |
| WO | 2013039726 A1 | 3/2013 |

OTHER PUBLICATIONS

Meyer, J. et al., "Methods and System for Operating a Driveline," U.S. Appl. No. 62/469,878, filed Mar. 10, 2017, 68 pages.
(Continued)

*Primary Examiner* — Jacob S. Scott
*Assistant Examiner* — Lillian T Nguyen
(74) *Attorney, Agent, or Firm* — David Kelley; McCoy Russell LLP

(57) ABSTRACT

Methods and systems are provided for operating a powertrain or driveline of a hybrid vehicle that includes two electric machines and a transmission are described. In one example, vehicle propulsion is maintained while transmission operating parameters are determined for improving transmission operation. In particular, a rear drive unit maintains vehicle speed and monitors torque delivered via an output of the transmission.

8 Claims, 11 Drawing Sheets

(51) Int. Cl.
*F16H 61/686* (2006.01)
*F16H 63/48* (2006.01)
*F16H 63/50* (2006.01)
*F16H 61/688* (2006.01)
*B60K 6/387* (2007.10)
*B60K 6/547* (2007.10)
*B60W 10/02* (2006.01)
*B60W 10/11* (2012.01)
*F16D 48/06* (2006.01)
*F16H 61/28* (2006.01)
*F16H 61/00* (2006.01)
*F16H 61/06* (2006.01)
*F16H 3/093* (2006.01)
*F16H 3/66* (2006.01)
*F16H 3/00* (2006.01)
*F16H 37/04* (2006.01)

(52) U.S. Cl.
CPC ............ *B60W 10/08* (2013.01); *B60W 10/11* (2013.01); *F16D 48/06* (2013.01); *F16H 61/686* (2013.01); *F16H 61/688* (2013.01); *F16H 63/48* (2013.01); *F16H 63/483* (2013.01); *F16H 63/486* (2013.01); *F16H 63/50* (2013.01); *B60W 2510/0275* (2013.01); *B60W 2510/0283* (2013.01); *B60W 2510/104* (2013.01); *B60W 2510/1015* (2013.01); *B60W 2710/027* (2013.01); *B60W 2710/028* (2013.01); *B60W 2710/081* (2013.01); *B60W 2720/10* (2013.01); *B60Y 2200/92* (2013.01); *F16D 2500/108* (2013.01); *F16D 2500/1064* (2013.01); *F16D 2500/10412* (2013.01); *F16D 2500/1107* (2013.01); *F16D 2500/30415* (2013.01); *F16D 2500/30816* (2013.01); *F16D 2500/30825* (2013.01); *F16H 3/006* (2013.01); *F16H 3/663* (2013.01); *F16H 37/042* (2013.01); *F16H 2003/0931* (2013.01); *F16H 2061/0087* (2013.01); *F16H 2061/064* (2013.01); *F16H 2061/283* (2013.01); *F16H 2200/006* (2013.01); *F16H 2200/0047* (2013.01); *F16H 2200/201* (2013.01); *F16H 2200/2023* (2013.01); *F16H 2200/2046* (2013.01); *Y10S 903/914* (2013.01); *Y10S 903/919* (2013.01); *Y10S 903/93* (2013.01)

(58) Field of Classification Search
CPC ....... F16H 2200/2023; F16H 2200/201; F16H 3/663; F16H 2200/006; F16H 2200/0047; F16H 2003/0931; F16H 37/042; F16H 2061/283; F16H 2061/0087; F16H 2061/064; F16H 3/006; B60K 6/547; B60K 6/387; F16D 48/06; F16D 2500/10412; F16D 2500/1064; F16D 2500/108; F16D 2500/1107; F16D 2500/30415; F16D 2500/30816; F16D 2500/30825; B60Y 2200/92; Y10S 903/919; Y10S 903/914; Y10S 903/93
See application file for complete search history.

(56) References Cited

U.S. PATENT DOCUMENTS

| | | | |
|---|---|---|---|
| 7,268,442 B2 | 9/2007 | Syed et al. | |
| 7,703,563 B2 | 4/2010 | Aldrich, III et al. | |
| 7,797,096 B2 | 9/2010 | Reynolds et al. | |
| 8,328,688 B2* | 12/2012 | Fujii | F16H 61/061 477/155 |
| 8,376,901 B2 | 2/2013 | Riester et al. | |
| 8,775,044 B2* | 7/2014 | Teslak | F16H 59/16 701/67 |
| 8,924,070 B2 | 12/2014 | Gibson et al. | |
| 9,108,638 B2 | 8/2015 | Banker et al. | |
| 9,260,107 B2 | 2/2016 | Doering et al. | |
| 9,358,974 B2 | 6/2016 | Doering et al. | |
| 9,365,121 B2 | 6/2016 | Kim et al. | |
| 9,365,211 B2 | 6/2016 | Gibson et al. | |
| 9,428,060 B2 | 8/2016 | Lasson et al. | |
| 2011/0153134 A1 | 6/2011 | Rocq et al. | |
| 2012/0022731 A1 | 1/2012 | Kuang et al. | |
| 2012/0279333 A1* | 11/2012 | Yinn | F16H 61/688 74/331 |
| 2013/0154576 A1 | 6/2013 | Shin et al. | |
| 2014/0074331 A1 | 3/2014 | Shin et al. | |
| 2014/0222273 A1* | 8/2014 | Banker | B60W 20/00 701/22 |
| 2014/0228165 A1 | 8/2014 | Frank et al. | |
| 2015/0114345 A1 | 4/2015 | Lockwood et al. | |
| 2015/0321656 A1* | 11/2015 | Nishikawa | B60K 6/365 192/219.4 |
| 2016/0046276 A1 | 2/2016 | Martin et al. | |
| 2016/0121742 A1 | 5/2016 | Cho et al. | |

OTHER PUBLICATIONS

Meyer, J. et al., "Systems and Methods for Battery Charging in a Hybrid Vehicle," U.S. Appl. No. 15/619,130, filed Jun. 9, 2017, 67 pages.

Meyer, J. et al., "Methods and System for Adjusting Engine Torque," U.S. Appl. No. 15/626,750, filed Jun. 19, 2017, 61 pages.

* cited by examiner

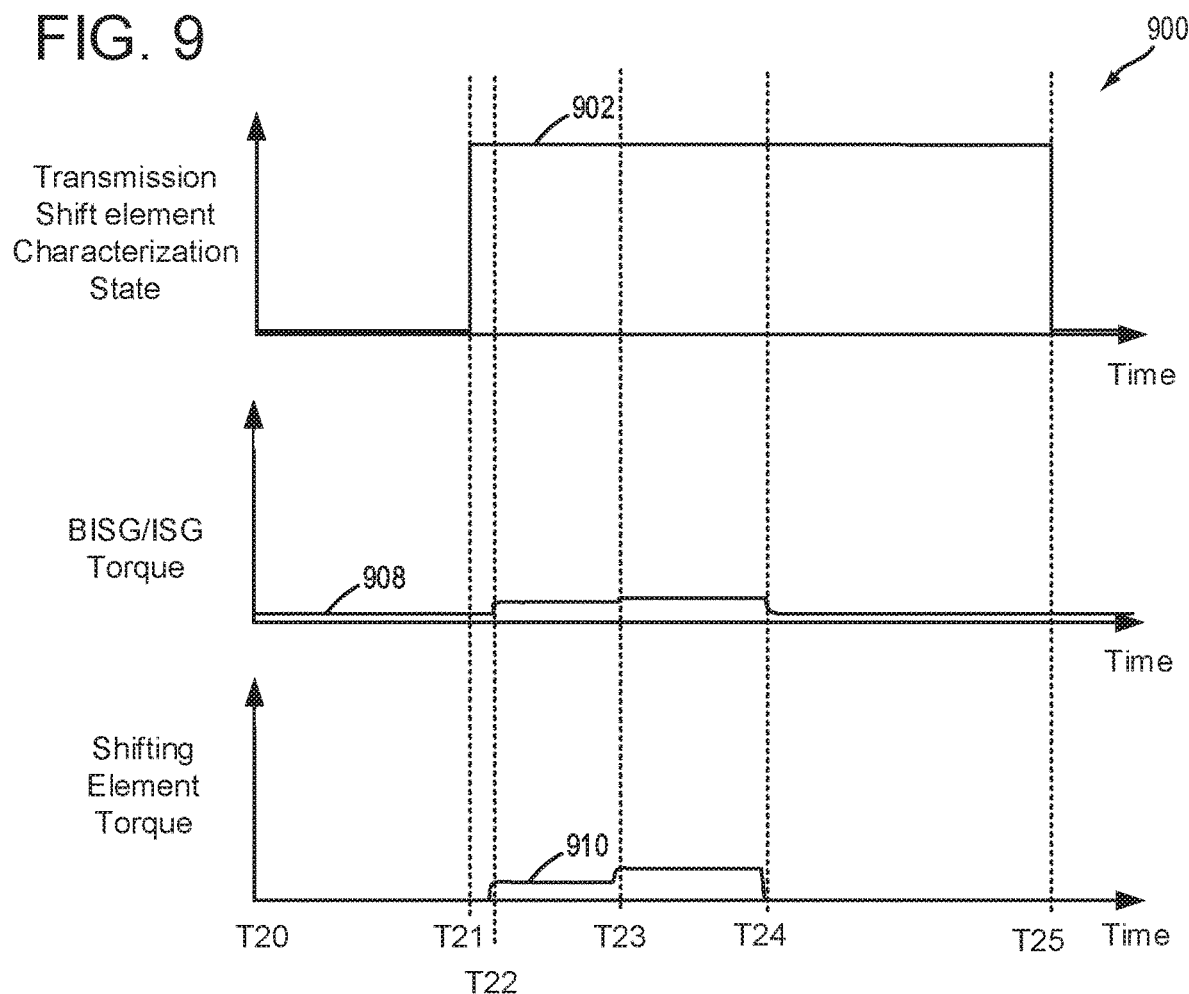

SYSTEM AND METHOD FOR OPERATING A VEHICLE POWERTRAIN

FIELD

The present description relates to systems and methods for determining operating characteristics of a transmission and operating a powertrain responsive to the operating characteristics. The system and methods may be suitable for powertrains that include a transmission that is positioned in a powertrain between two electric machines.

BACKGROUND/SUMMARY

A hybrid vehicle may include an engine, an electric machine, and a step ratio transmission. The transmission allows different vehicle speeds to be achieved while allowing the engine to operate in a desired speed range. By operating the engine in a desired speed range, engine emissions and performance may be improved. However, consistently shifting gears of a step ratio transmission as a vehicle ages may require on-going adaptation of transmission control parameters. Vehicle occupants may find it objectionable to wait for vehicle parameters to be adapted when they wish to reach a destination. Further, since internal combustion piston engines combust at fixed crankshaft intervals, it may be difficult to decouple combustion artifacts from the parameter or variable being adapted. Therefore, it would be desirable to provide a way of adapting transmission control parameters with minimal vehicle occupant interference.

The inventors herein have recognized the above-mentioned issues and have developed a powertrain operating method, comprising: at least partially engaging a gear synchronizer or a band brake while rotating a transmission input shaft via an electric machine, a transmission output shaft held stopped while rotating the transmission input shaft via the electric machine; and adjusting transmission shifting in response to a torque transferred via the gear synchronizer or the band.

By rotating transmission components via an electric machine and adjusting transmission shifting responsive to torque transferred while a transmission output shaft is held stopped, it may be possible to determine operating status of transmission components. In one example, a transmission component state may be adjusted while an electric machine rotates an input shaft of a transmission while the output shaft of the transmission is not rotating. The change in electric machine current may be indicative of torque transferred via the transmission shift element. The shift element state may be adjusted while the vehicle is parked or stopped during a drive cycle so that vehicle occupants may not be disturbed. In still other examples, vehicle speed may be maintained while transmission parameters are determined so that transmission control parameters may be adjusted with a lower possibility of disturbing vehicle occupants.

The present description may provide several advantages. In particular, the approach may improve transmission operation over a life of a transmission. Further, the approach may improve transmission operation without disturbing vehicle occupants. In addition, the approach may provide improved control parameter estimates.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 9 is a prophetic powertrain operating sequence according to the method of FIG. 8.

DETAILED DESCRIPTION

Figure 4:
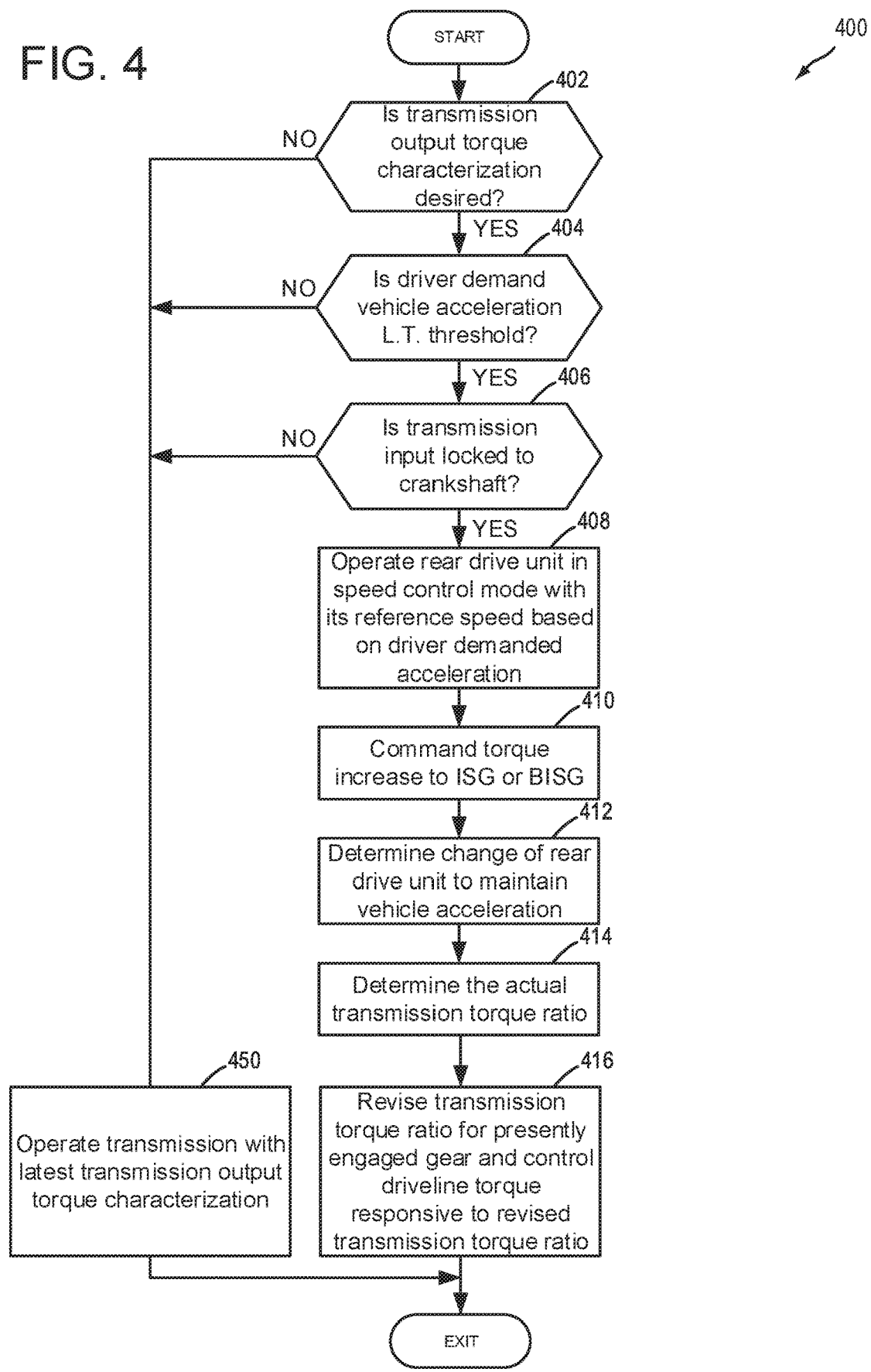
FIG. 4 is a flowchart of a first method to operate a hybrid vehicle driveline.
Figure 5:
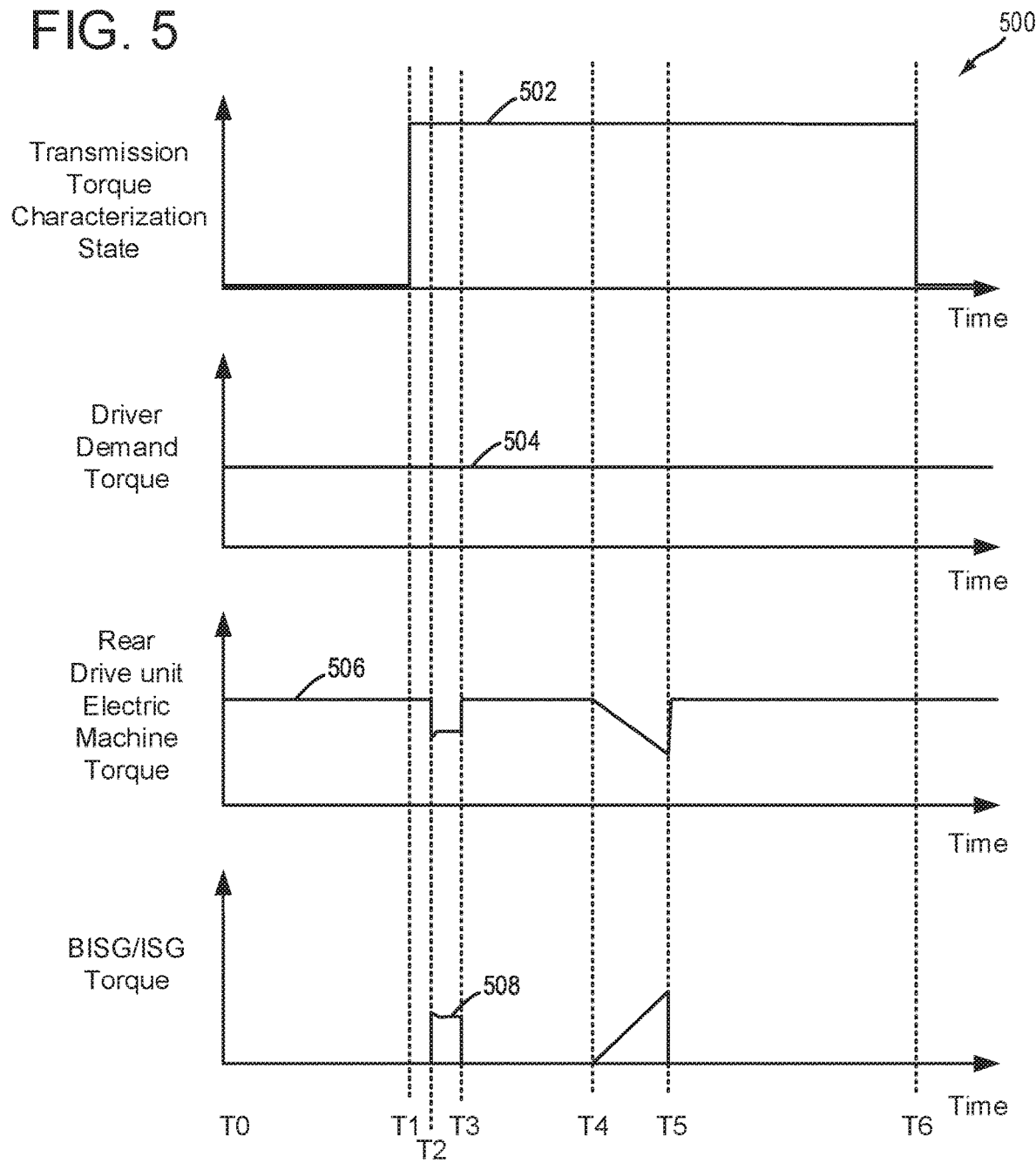
FIG. 5 is a prophetic powertrain operating sequence according to the method of FIG. 4.
Figure 6:
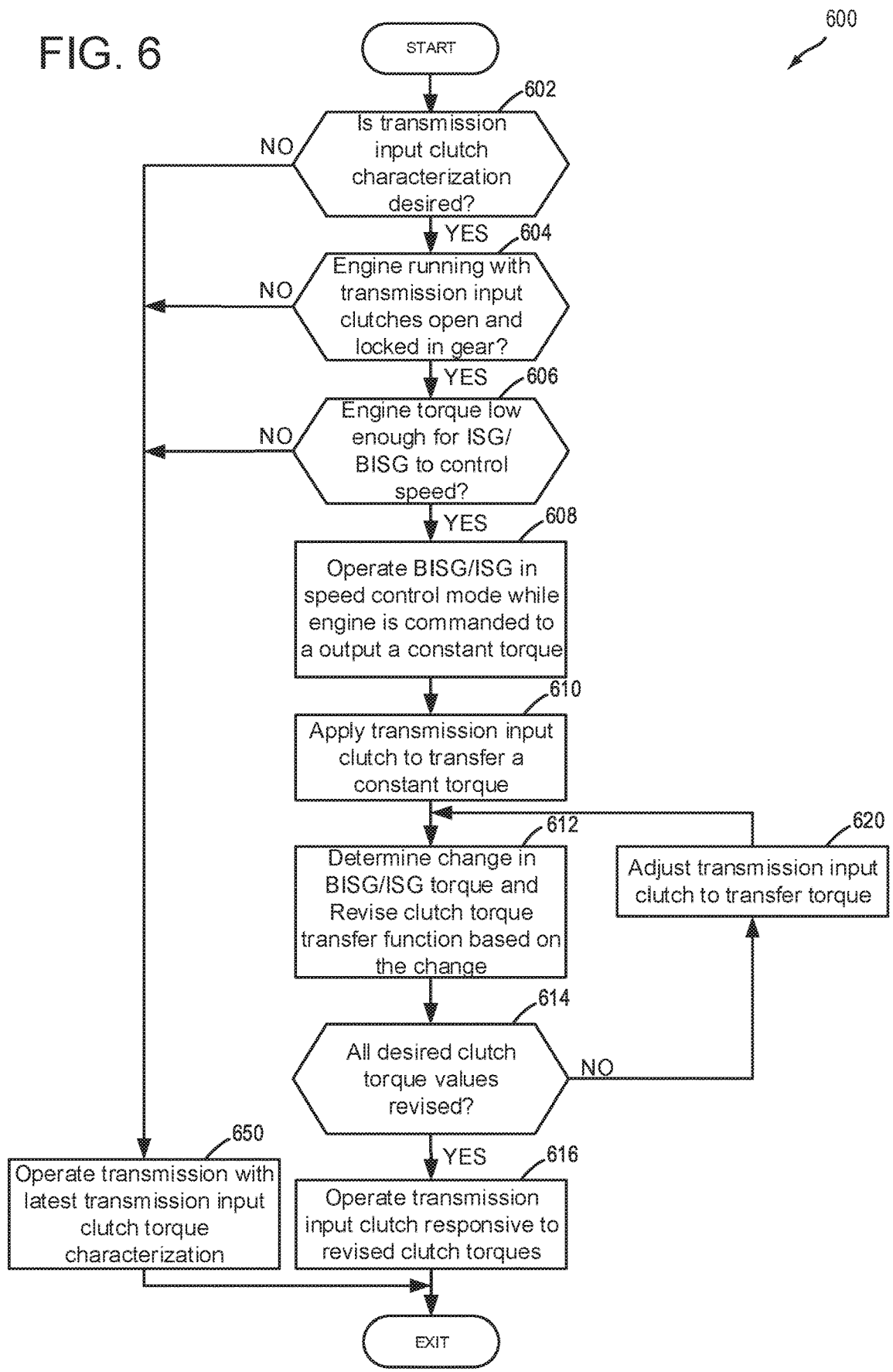
FIG. 6 is a flowchart of a second method to operate a hybrid vehicle driveline.
Figure 7:
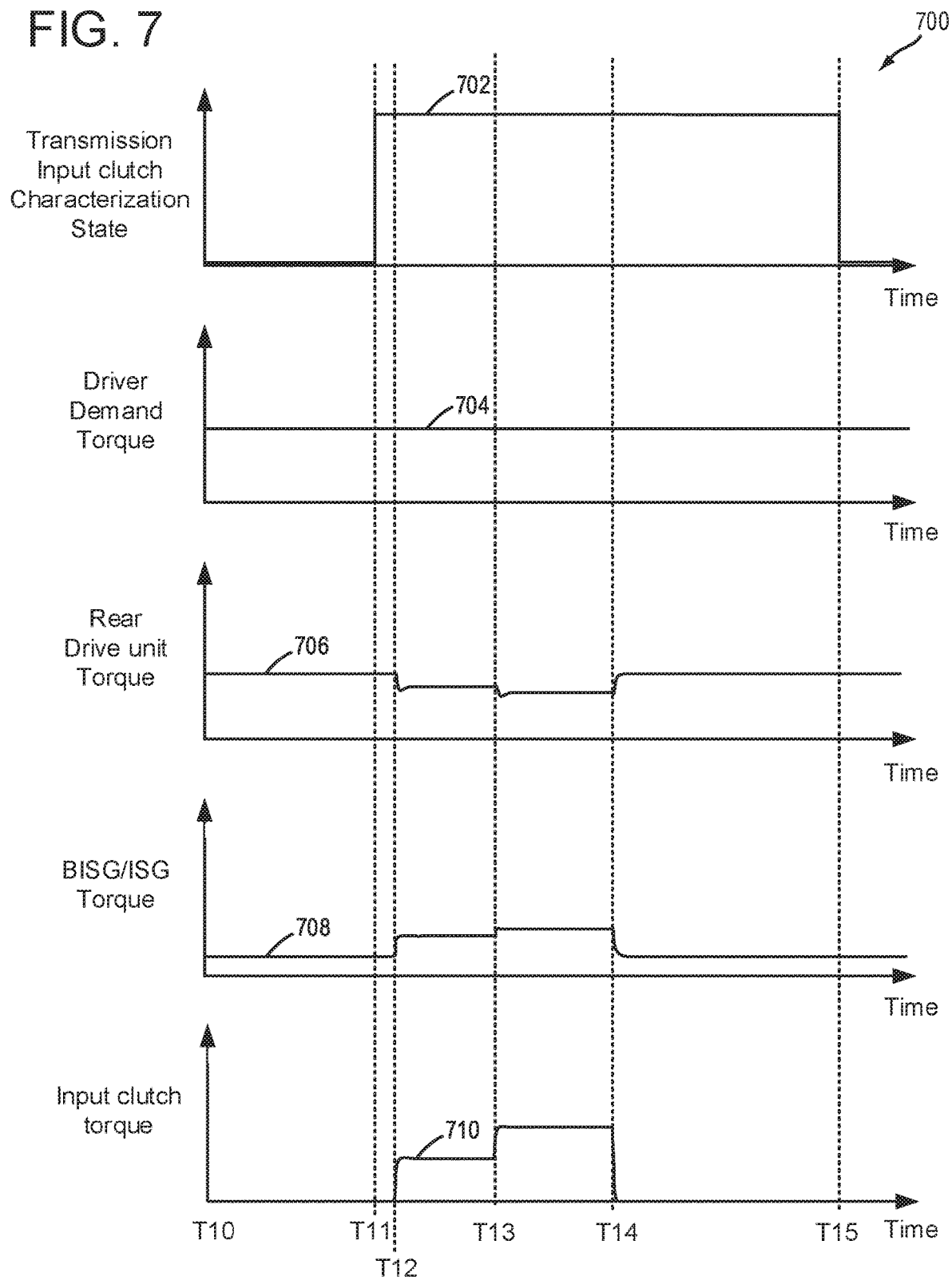
FIG. 7 is a prophetic powertrain operating sequence according to the method of FIG. 5.
Figure 8:
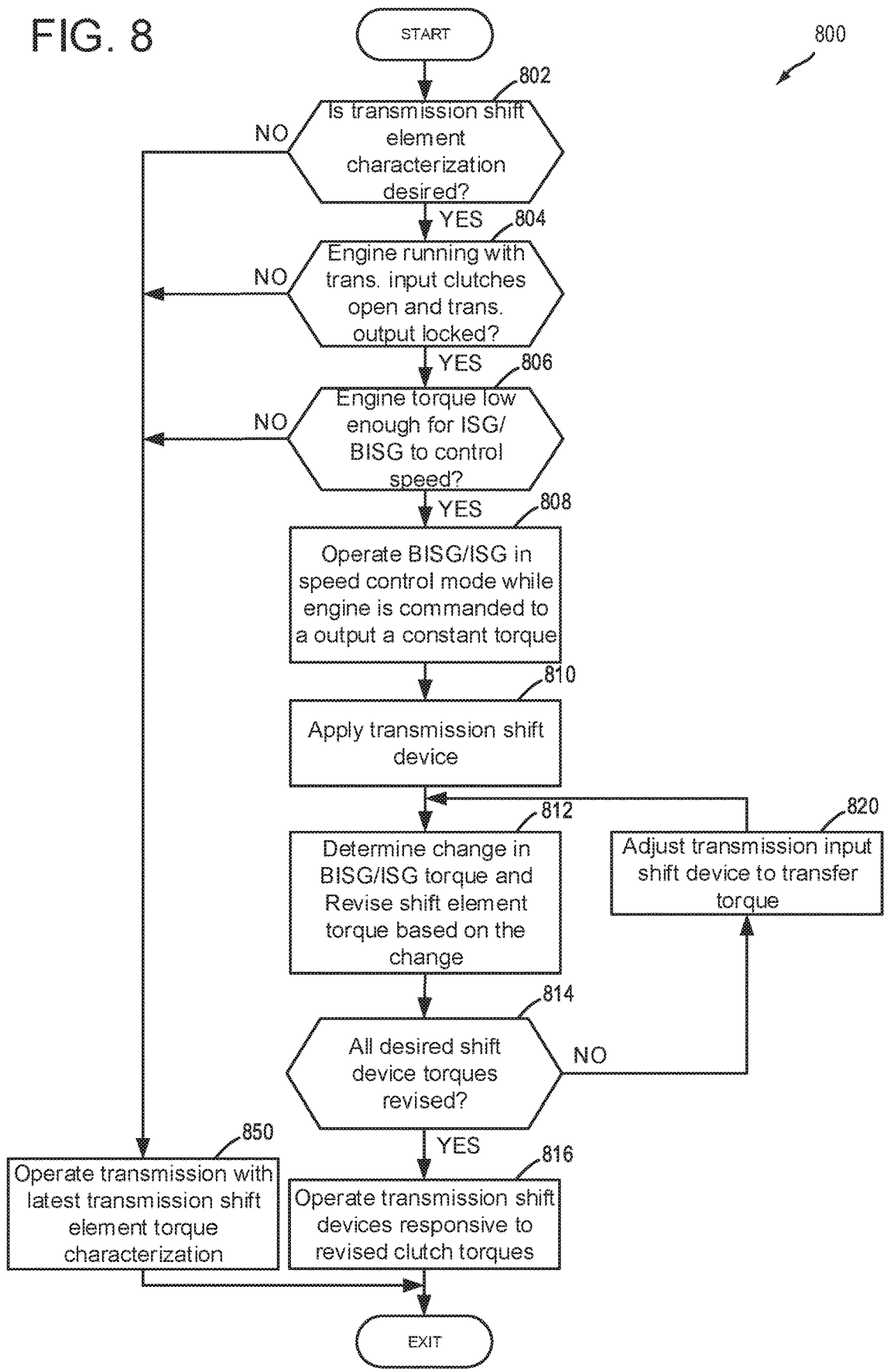
FIG. 8 is a flowchart of a third method to operate a hybrid vehicle driveline.

The following description relates to systems and methods for operating a driveline of a hybrid vehicle. FIGS. 1A-3B show an example hybrid vehicle system that includes a driveline with an engine, an integrated starter/generator, a dual clutch transmission, and a rear drive unit with an electric machine that is positioned downstream of the dual clutch transmission. FIGS. 4, 6, and 8 show methods for operating the hybrid driveline or powertrain. In particular, the methods describe ways of identifying system control parameters to improve driveline operating and control. FIGS. 5, 7, and 9 show example operating sequences according to the methods of FIGS. 4, 6, and 8.

Figure 1A:
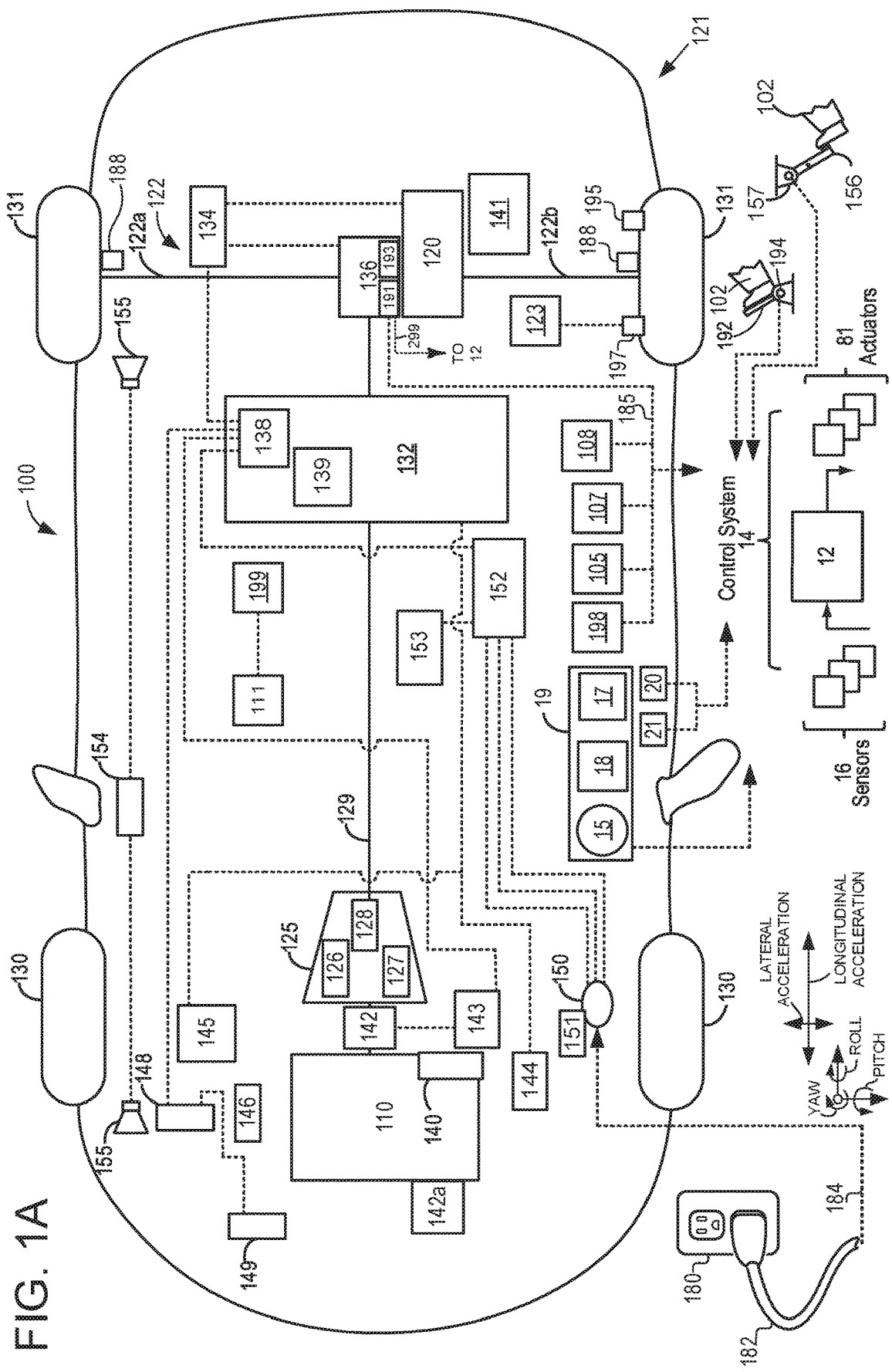
FIG. 1A is a schematic diagram of a hybrid vehicle driveline.

FIG. 1A illustrates an example vehicle propulsion system 100 for vehicle 121. Vehicle propulsion system 100 includes at least two power sources including an internal combustion engine 110 and an electric machine 120. Electric machine 120 may be configured to utilize or consume a different energy source than engine 110. For example, engine 110 may consume liquid fuel (e.g. gasoline) to produce an engine output while electric machine 120 may consume electrical energy to produce an electric machine output. As such, a vehicle with propulsion system 100 may be referred to as a hybrid electric vehicle (HEV). Throughout the description of FIG. 1A, mechanical connections between various components is illustrated as solid lines, whereas electrical connections between various components are illustrated as dashed lines.

Vehicle propulsion system 100 has a front axle (not shown) and a rear axle 122. In some examples, rear axle may comprise two half shafts, for example first half shaft 122a, and second half shaft 122b. Vehicle propulsion system 100 further has front wheels 130 and rear wheels 131. The rear axle 122 is coupled to electric machine 120 and to transmission 125 via driveshaft 129. The rear axle 122 may be driven either purely electrically and exclusively via electric machine 120 (e.g., electric only drive or propulsion mode, engine is not combusting air and fuel or rotating), in a hybrid fashion via electric machine 120 and engine 110 (e.g., parallel mode), or exclusively via engine 110 (e.g., engine only propulsion mode), in a purely combustion engine-operated fashion. Rear drive unit 136 may transfer power from engine 110 or electric machine 120, to axle 122, resulting in rotation of drive wheels 131. Rear drive unit 136 may include a gear set, differential 193, and an electrically controlled differential clutch 191 that adjusts torque transfer to axle 122a and to axle 122b. In some examples, electrically controlled differential clutch 191 may communicate a torque of the electrically controlled differential clutch via CAN bus 299. Torque transfer to axle 122a and 122b may be equal when electrically controlled differential clutch is open. Torque transfer to axle 122a may be different from torque transferred to axle 122b when electrically controlled differential clutch 191 is partially closed (e.g., slipping such that speed input to the clutch is different than speed output of the clutch) or closed. Rear drivel unit 136 may also include one or more clutches (not shown) to decouple transmission 125 and electric machine 120 from wheels 131. Rear drive unit 136 may be directly coupled to electric machine 120 and axle 122.

A transmission 125 is illustrated in FIG. 1A as connected between engine 110, and electric machine 120 assigned to rear axle 122. In one example, transmission 125 is a dual clutch transmission (DCT). In an example wherein transmission 125 is a DCT, DCT may include a first clutch 126, a second clutch 127, and a gear box 128. DCT 125 outputs torque to drive shaft 129 to supply torque to wheels 131. As will be discussed in further detail below with regard to FIG. 2, transmission 125 may shift gears by selectively opening and closing first clutch 126 and second clutch 127.

Electric machine 120 may receive electrical power from onboard electric energy storage device 132. Furthermore, electric machine 120 may provide a generator function to convert engine output or the vehicle's kinetic energy into electrical energy, where the electrical energy may be stored at energy storage device 132 for later use by the electric machine 120, integrated starter/generator 142, or belt integrated starter generator 142a. A first inverter system controller (ISC1) 134 may convert alternating current generated by electric machine 120 to direct current for storage at the energy storage device 132 and vice versa.

In some examples, energy storage device 132 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 132 may include one or more batteries and/or capacitors.

Control system 14 may communicate with one or more of engine 110, electric machine 120, energy storage device 132, integrated starter/generator 142, transmission 125, etc. Control system 14 may receive sensory feedback information from one or more of engine 110, electric machine 120, energy storage device 132, integrated starter/generator 142, transmission 125, etc. Further, control system 14 may send control signals to one or more of engine 110, electric machine 120, energy storage device 132, transmission 125, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source 180 (e.g., a stationary power grid) residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 132 from power source 180 via an electrical energy transmission cable 182. During a recharging operation of energy storage device 132 from power source 180, electrical transmission cable 182 may electrically couple energy storage device 132 and power source 180. In some examples, power source 180 may be connected at inlet port 150. Furthermore, in some examples, a charge status indicator 151 may display a charge status of energy storage device 132.

In some examples, electrical energy from power source 180 may be received by charger 152. For example, charger 152 may convert alternating current from power source 180 to direct current (DC), for storage at energy storage device 132. Furthermore, a DC/DC converter 153 may convert a source of direct current from charger 152 from one voltage to another voltage. In other words, DC/DC converter 153 may act as a type of electric power converter.

While the vehicle propulsion system is operated to propel the vehicle, electrical transmission cable 182 may be disconnected between power source 180 and energy storage device 132. Control system 14 may identify and/or control the amount of electrical energy stored at the energy storage device, which may be referred to as the state of charge (SOC).

In other examples, electrical transmission cable 182 may be omitted, where electrical energy may be received wirelessly at energy storage device 132 from power source 180. For example, energy storage device 132 may receive electrical energy from power source 180 via one or more of electromagnetic induction, radio waves, and electromagnetic resonance. As such, it should be appreciated that any suitable approach may be used for recharging electric energy storage device 132 from a power source that does not comprise part of the vehicle. In this way, electric machine 120 may propel the vehicle by utilizing an energy source other than the fuel utilized by engine 110.

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

Vehicle propulsion system 100 may also include an ambient temperature/humidity sensor 198, and sensors dedicated to indicating the occupancy-state of the vehicle, for example onboard cameras 105, seat load cells 107, and door sensing technology 108. Vehicle system 100 may also include inertial sensors 199. Inertial sensors 199 may comprise one or more of the following: longitudinal, latitudinal, vertical, yaw, roll, and pitch sensors (e.g., accelerometers). Axes of yaw, pitch, roll, lateral acceleration, and longitudinal acceleration are as indicated. As one example, inertial sensors 199 may couple to the vehicle's restraint control module (RCM) (not shown), the RCM comprising a subsystem of control system 14. The control system may adjust engine output and/or the wheel brakes to increase vehicle stability in response to sensor(s) 199. In another example, the control system may adjust an active suspension system 111 responsive to input from inertial sensors 199. Active suspension system 111 may comprise an active suspension system having hydraulic, electrical, and/or mechanical devices, as well as active suspension systems that control the vehicle height on an individual corner basis (e.g., four corner independently controlled vehicle heights), on an axle-by-axle basis (e.g., front axle and rear axle vehicle heights) or a single vehicle height for the entire vehicle. Data from inertial sensor 199 may also be communicated to controller 12, or alternatively, sensors 199 may be electrically coupled to controller 12. Normal load or force applied to driven wheels 131 may be determined via load sensors 188.

One or more tire pressure monitoring sensors (TPMS) may be coupled to one or more tires of wheels in the vehicle. For example, FIG. 1A shows a tire pressure sensor 197 coupled to wheel 131 and configured to monitor a pressure in a tire of wheel 131. While not explicitly illustrated, it may be understood that each of the four tires indicated in FIG. 1A may include one or more tire pressure sensor(s) 197. Furthermore, in some examples, vehicle propulsion system 100 may include a pneumatic control unit 123. Pneumatic control unit may receive information regarding tire pressure from tire pressure sensor(s) 197, and send said tire pressure information to control system 14. Based on said tire pressure information, control system 14 may command pneumatic control unit 123 to inflate or deflate tire(s) of the vehicle wheels. While not explicitly illustrated, it may be understood that pneumatic control unit 123 may be used to inflate or deflate tires associated with any of the four wheels illustrated in FIG. 1A. For example, responsive to an indication of a tire pressure decrease, control system 14 may command pneumatic control system unit 123 to inflate one or more tire(s). Alternatively, responsive to an indication of a tire pressure increase, control system 14 may command pneumatic control system unit 123 to deflate tire(s) one or more tires. In both examples, pneumatic control system unit 123 may be used to inflate or deflate tires to an optimal tire pressure rating for said tires, which may prolong tire life.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include an accelerometer 20. Vehicle propulsion system 100 may further include an inclinometer 21.

Vehicle propulsion system 100 may further include a starter 140. Starter 140 may comprise an electric motor, hydraulic motor, etc., and may be used to rotate engine 110 so as to initiate engine 110 operation under its own power.

Vehicle propulsion system 100 may further include a brake system control module (BSCM) 141. In some examples, BSCM 141 may comprise an anti-lock braking system, such that wheels (e.g. 130, 131) may maintain tractive contact with the road surface according to driver inputs while braking, which may thus prevent the wheels from locking up, to prevent skidding. In some examples, BSCM may receive input from wheel speed sensors 195.

Vehicle propulsion system 100 may further include a belt integrated starter generator (BISG) 142a. BISG may produce electric power when the engine 110 is in operation, where the electrical power produced may be used to supply electric devices and/or to charge the onboard storage device 132. Likewise, vehicle propulsion system 100 may further include an integrated starter generator 142. ISG may produce electric power when the engine 110 is in operation, where the electrical power produced may be used to supply electric devices and/or to charge the onboard storage device 132. As indicated in FIG. 1A, a second inverter system controller (ISC2) 143 may receive alternating current from ISG 142, and may convert alternating current generated by ISG 142 to direct current for storage at energy storage device 132. Integrated starter/generator 142 may also provide torque to engine 110 during engine starting or other conditions to supplement engine torque.

In some examples, vehicle propulsion system 100 may include one or more electric machines 135a and 135b to propel vehicle 121 or to provide regenerative braking via front wheels 130. Third inverter (ISC3) 147a may convert alternating current generated by electric machine 135a to direct current for storage at the electric energy storage device 132 or provide alternating current to electric machine 135a to propel vehicle 121. Likewise, fourth inverter (ISC4) 147a may convert alternating current generated by electric machine 135b to direct current for storage at the electric energy storage device 132 or provide alternating current to electric machine 135b to propel vehicle 121. Electric machines 135a and 135b may be collectively referred to as front wheel electric machines. Alternatively, a single front wheel electric machine may drive and/or provide regenerative braking to both front wheels 130 via an axle that may include an electronic limited slip differential as shown at 136, 191, and 193.

Vehicle propulsion system 100 may further include a power distribution box (PDB) 144. PDB 144 may be used for routing electrical power throughout various circuits and accessories in the vehicle's electrical system.

Vehicle propulsion system 100 may further include a high current fuse box (HCFB) 145, and may comprise a variety of fuses (not shown) used to protect the wiring and electrical components of vehicle propulsion system 100.

Vehicle propulsion system 100 may further include a motor electronics coolant pump (MECP) 146. MECP 146 may be used to circulate coolant to diffuse heat generated by at least electric machine 120 of vehicle propulsion system 100, and the electronics system. MECP may receive electrical power from onboard energy storage device 132, as an example.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include tire pressure sensor(s) 197, wheel speed sensor(s) 195, ambient temperature/humidity sensor 198, onboard cameras 105, seat load cells 107, door sensing technology 108, inertial sensors 199, etc. In some examples, sensors associated with engine 110, transmission 125, electric machine 120, etc., may communicate information to controller 12, regarding various states of engine, transmission, and motor operation, as will be discussed in further detail with regard to FIG. 1B, FIG. 2 and FIG. 3A.

Vehicle propulsion system 100 may further include a positive temperature coefficient (PTC) heater 148. As an example, PTC heater 148 may comprise a ceramic material such that when resistance is low, the ceramic material may accept a large amount of current, which may result in a rapid warming of the ceramic element. However, as the element warms and reaches a threshold temperature, the resistance may become very large, and as such, may not continue to produce much heat. As such, PTC heater 148 may be self-regulating, and may have a good degree of protection from overheating.

Vehicle propulsion system 100 may further include an air conditioning compressor module 149, for controlling an electric air conditioning compressor (not shown).

Vehicle propulsion system 100 may further include a vehicle audible sounder for pedestrians (VASP) 154. For example, VASP 154 may be configured to produce audible sounds via sounders 155. In some examples, audible sounds produced via VASP 154 communicating with sounders 155 may be activated responsive to a vehicle operator triggering the sound, or automatically, responsive to engine speed below a threshold or detection of a pedestrian.

Vehicle propulsion system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., engine 110, ISG 142, BISG 142a, DCT 125, and electric machine 130) based on an operator input. Various examples of the operator ignition interface 15 may include interfaces that require a physical apparatus, such as an active key, that may be inserted into the operator ignition interface 15 to start the engine 110 and turn on the vehicle, or may be removed to shut down the engine 110 and turn off the vehicle. Other examples may include a passive key that is communicatively coupled to the operator ignition interface 15. The passive key may be configured as an electronic key fob or a smart key that does not have to be inserted or removed from the ignition interface 15 to operate the vehicle engine 110. Rather, the passive key may need to be located inside or proximate to the vehicle (e.g., within a threshold distance of the vehicle). Still other examples may additionally or optionally use a start/stop button that is manually pressed by the operator to start or shut down the engine 110 and turn the vehicle on or off. In other examples, a remote engine start may be initiated remote computing device (not shown), for example a cellular telephone, or smartphone-based system where a user's cellular telephone sends data to a server and the server communicates with the vehicle controller 12 to start the engine.

Figure 1B:
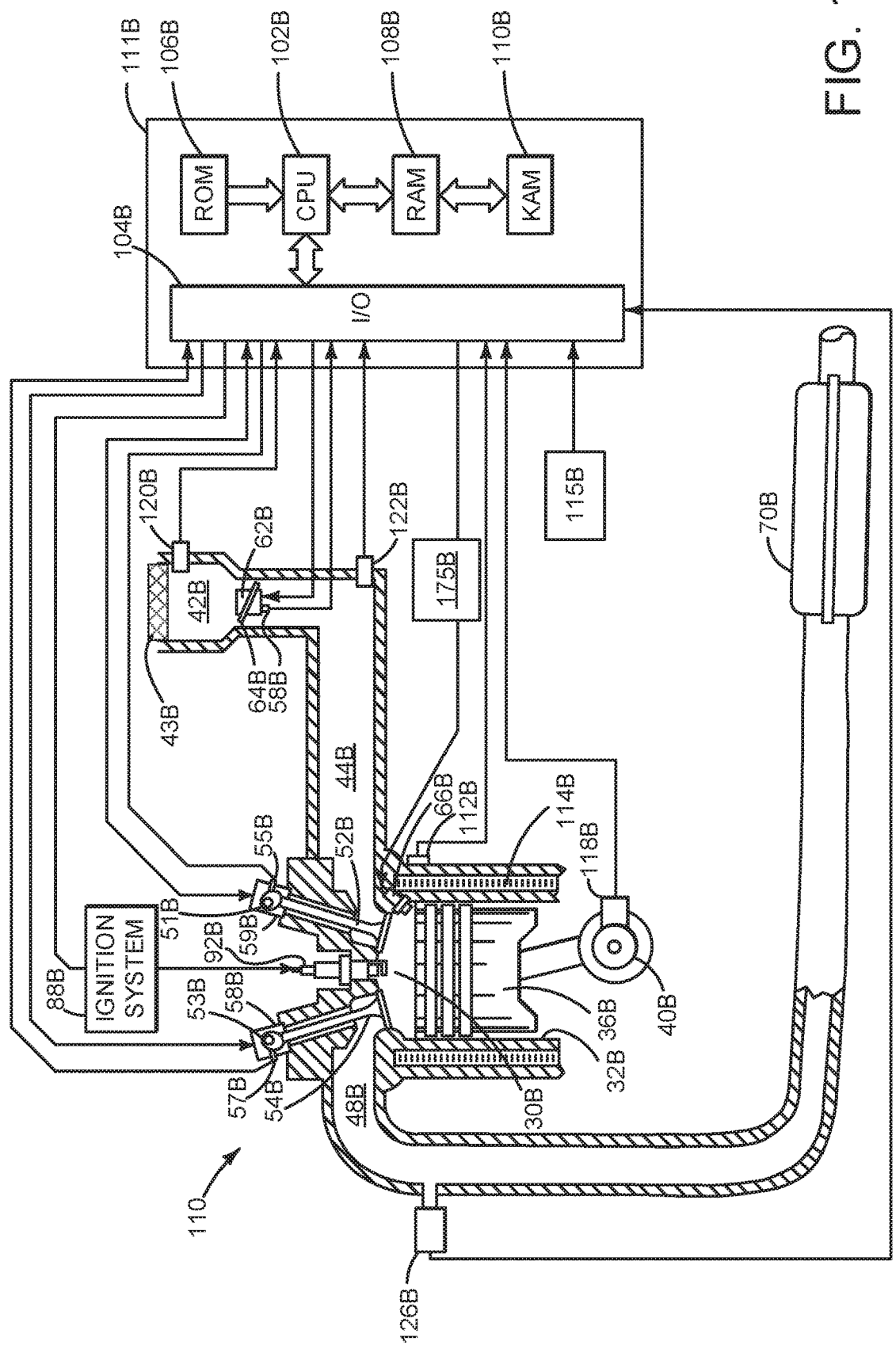
FIG. 1B is a sketch of an engine of the hybrid vehicle driveline.

Referring to FIG. 1B, a detailed view of internal combustion engine 110, comprising a plurality of cylinders, one cylinder of which is shown in FIG. 1B, is shown. Engine 110 is controlled by electronic engine controller 111B. Engine 110 includes combustion chamber 30B and cylinder walls 32B with piston 36B positioned therein and connected to crankshaft 40B. Combustion chamber 30B is shown communicating with intake manifold 44B and exhaust manifold 48B via respective intake valve 52B and exhaust valve 54B. Each intake and exhaust valve may be operated by an intake cam 51B and an exhaust cam 53B. The position of intake cam 51B may be determined by intake cam sensor 55B. The position of exhaust cam 53B may be determined by exhaust cam sensor 57B. Intake cam 51B and exhaust cam 53B may be moved relative to crankshaft 40B. Intake valves may be deactivated and held in a closed state via intake valve deactivating mechanism 59B. Exhaust valves may be deactivated and held in a closed state via exhaust valve deactivating mechanism 58B.

Fuel injector 66B is shown positioned to inject fuel directly into cylinder 30B, which is known to those skilled in the art as direct injection. Alternatively, fuel may be injected to an intake port, which is known to those skilled in the art as port injection. Fuel injector 66B delivers liquid fuel in proportion to the pulse width of signal from engine controller 111B. Fuel is delivered to fuel injector 66B by a fuel system 175B, which includes a tank and pump. In addition, intake manifold 44B is shown communicating with optional electronic throttle 62B (e.g., a butterfly valve) which adjusts a position of throttle plate 64B to control air flow from air filter 43B and air intake 42B to intake manifold 44B. Throttle 62B regulates air flow from air filter 43B in engine air intake 42B to intake manifold 44B. In some examples, throttle 62B and throttle plate 64B may be positioned between intake valve 52B and intake manifold 44B such that throttle 62B is a port throttle.

Distributorless ignition system 88B provides an ignition spark to combustion chamber 30B via spark plug 92B in response to engine controller 111B. Universal Exhaust Gas Oxygen (UEGO) sensor 126B is shown coupled to exhaust manifold 48B upstream of catalytic converter 70B in a direction of exhaust flow. Alternatively, a two-state exhaust gas oxygen sensor may be substituted for UEGO sensor 126B.

Converter 70B can include multiple catalyst bricks, in one example. In another example, multiple emission control devices, each with multiple bricks, can be used. Converter 70B can be a three-way type catalyst in one example.

Engine controller 111B is shown in FIG. 1B as a conventional microcomputer including: microprocessor unit 102B, input/output ports 104B, read-only memory 106B (e.g., non-transitory memory), random access memory 108B, keep alive memory 110B, and a conventional data bus. Other controllers mentioned herein may have a similar processor and memory configuration. Engine controller 111B is shown receiving various signals from sensors coupled to engine 110, in addition to those signals previously discussed, including: engine coolant temperature (ECT) from temperature sensor 112B coupled to cooling sleeve 114B; a measurement of engine manifold pressure (MAP) from pressure sensor 122B coupled to intake manifold 44B; an engine position sensor from a Hall effect sensor 118B sensing crankshaft 40B position; a measurement of air mass entering the engine from sensor 120B; and a measurement of throttle position from sensor 58B. Barometric pressure may also be sensed (sensor not shown) for processing by engine controller 111B. In a preferred aspect of the present description, engine position sensor 118B produces a predetermined number of equally spaced pulses every revolution of the crankshaft from which engine speed (RPM) can be determined. Engine controller 111B may receive input from human/machine interface 115B (e.g., pushbutton or touch screen display).

During operation, each cylinder within engine 110 typically undergoes a four stroke cycle: the cycle includes the intake stroke, compression stroke, expansion stroke, and exhaust stroke. During the intake stroke, generally, the exhaust valve 54B closes and intake valve 52B opens. Air is introduced into combustion chamber 30B via intake manifold 44B, and piston 36B moves to the bottom of the cylinder so as to increase the volume within combustion chamber 30B. The position at which piston 36B is near the bottom of the cylinder and at the end of its stroke (e.g. when combustion chamber 30B is at its largest volume) is typically referred to by those of skill in the art as bottom dead center (BDC). During the compression stroke, intake valve 52B and exhaust valve 54B are closed. Piston 36B moves toward the cylinder head so as to compress the air within combustion chamber 30B. The point at which piston 36B is at the end of its stroke and closest to the cylinder head (e.g. when combustion chamber 30B is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92B, resulting in combustion. During the expansion stroke, the expanding gases push piston 36B back to BDC. Crankshaft 40B converts piston movement into a rotational torque of the rotary shaft. Finally, during the exhaust stroke, the exhaust valve 54B opens to release the combusted air-fuel mixture to exhaust manifold 48B and the piston returns to TDC. Note that the above is shown merely as an example, and that intake and exhaust valve opening and/or closing timings may vary, such as to provide positive or negative valve overlap, late intake valve closing, or various other examples.

Figure 2:
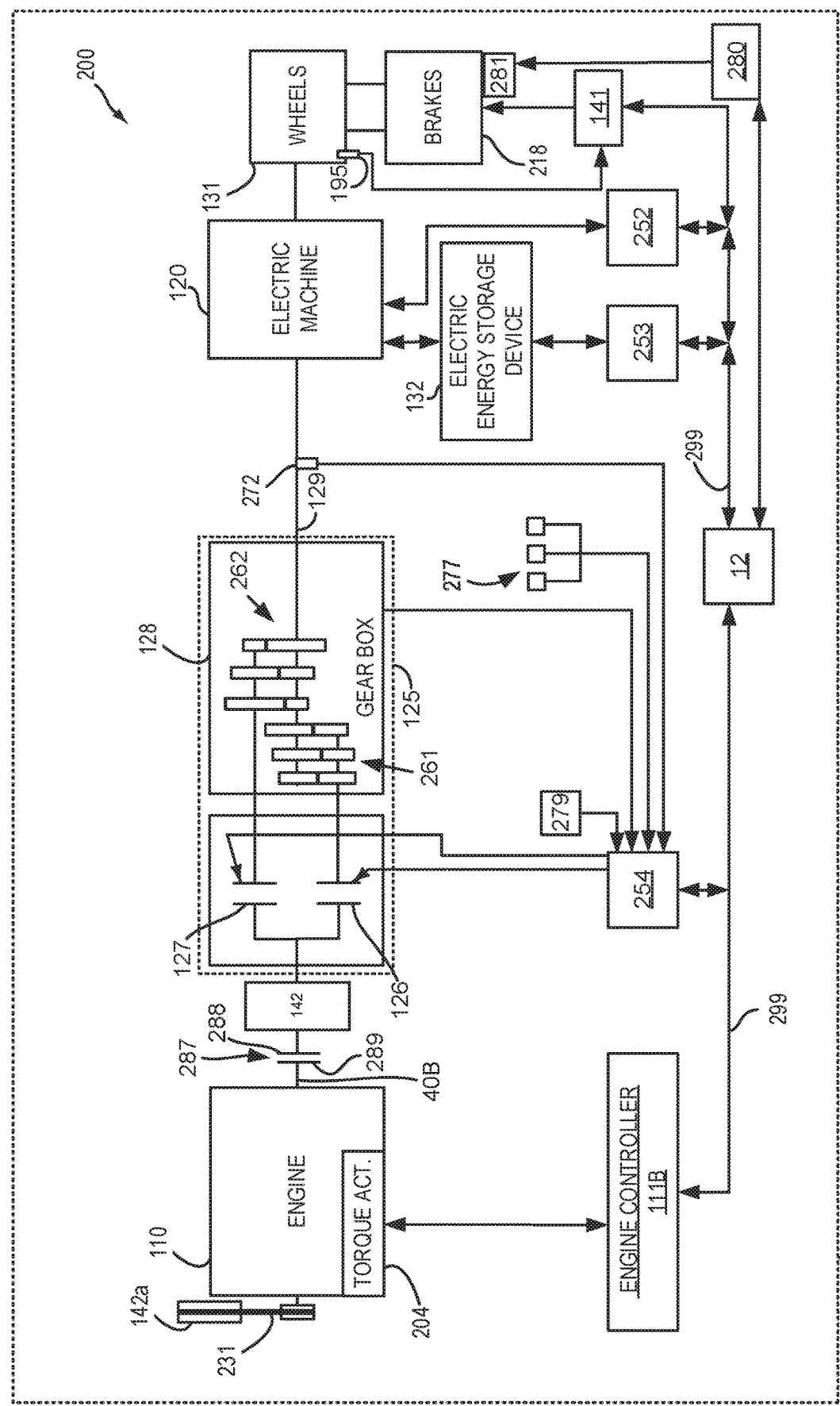
FIG. 2 is a schematic diagram of the hybrid vehicle driveline including controllers of various driveline components.

FIG. 2 is a block diagram of vehicle 121 including a powertrain or driveline 200. The powertrain of FIG. 2 includes engine 110 shown in FIGS. 1A-1B. Other components of FIG. 2 that are common with FIG. 1A are indicated by like numerals, and will be discussed in detail below. Powertrain 200 is shown including vehicle system controller 12, engine controller 111B, electric machine controller 252, transmission controller 254, energy storage device controller 253, and brake controller 141 (also referred to herein as brake system control module). The controllers may communicate over controller area network (CAN) 299. Each of the controllers may provide information to other controllers such as torque output limits (e.g. torque output of the device or component being controlled not to be exceeded), torque input limits (e.g. torque input of the device or component being controlled not to be exceeded), torque output of the device being controlled, sensor an actuator data, diagnostic information (e.g. information regarding a degraded transmission, information regarding a degraded engine, information regarding a degraded electric machine, information regarding degraded brakes). Further, the vehicle system controller 12 may provide commands to engine controller 111B, electric machine controller 252, transmission controller 254, and brake controller 141 to achieve driver input requests and other requests that are based on vehicle operating conditions.

For example, in response to a driver releasing an accelerator pedal and vehicle speed decreasing, vehicle system controller 12 may request a desired wheel torque or wheel power level to provide a desired rate of vehicle deceleration. The desired wheel torque may be provided by vehicle system controller 12 requesting a first braking torque from electric machine controller 252 and a second braking torque from brake controller 141, the first and second torques providing the desired braking torque at vehicle wheels 131.

In other examples, the partitioning of controlling powertrain devices may be partitioned differently than is illustrated in FIG. 2. For example, a single controller may take the place of vehicle system controller 12, engine controller 111B, electric machine controller 252, transmission controller 254, and brake controller 141. Alternatively, the vehicle system controller 12 and the engine controller 111B may be a single unit while the electric machine controller 252, the transmission controller 254, and the brake controller 141 may be standalone controllers.

In this example, powertrain 200 may be powered by engine 110 and electric machine 120. In other examples, engine 110 may be omitted. Engine 110 may be started with an engine starter (e.g. 140), ISG 142, via belt integrated starter/generator (BISG) 142a, or via electric machine 120. In some examples, ISG 142 may be coupled directly to the engine crankshaft at either end (e.g., front or back) of the crankshaft. Electric machine 120 (e.g. high voltage electric machine, operated with greater than 30 volts), is also referred to herein as electric machine, motor, and/or generator. Further, torque of engine 110 may be adjusted via a torque actuator 204, such as a fuel injector, throttle, etc.

BISG 142 is mechanically coupled to engine 110 via belt 231. BISG 142 may be coupled to a crankshaft (not shown) or a camshaft (not shown). BISG 142 may operate as a motor when supplied with electrical power via electric energy storage device 132, also referred to herein as onboard energy storage device 132. BISG 142 may additionally operate as a generator supplying electrical power to electric energy storage device 132.

Driveline 200 includes engine 110 that may be selectively mechanically coupled to ISG 142 and dual clutch transmission (DCT) 125 via crank shaft 40B and driveline disconnect clutch 287. Driveline disconnect clutch includes an input side 289 (e.g., first side) and an output side 288 (e.g., a second side). DCT 125 includes a first clutch 126, a second clutch 127, and a gear box 128. DCT 125 outputs torque to shaft 129, to supply torque to vehicle wheels 131. Transmission controller 254 selectively opens and closes first clutch 126 and second clutch 127 to shift DCT 125. In some examples, DCT 125 may instead be an automatic planetary gear step ratio transmission as shown in FIG. 3B.

Gear box 128 may include a plurality of gears. One clutch, for example first clutch 126 may control odd gears 261 (e.g. first, third, fifth, and reverse), while another clutch, for example second clutch 127, may control even gears 262 (e.g. second, fourth, and sixth). By utilizing such an arrangement, gears can be changed without interrupting power flow from the engine 110 to dual clutch transmission 125.

Electric machine 120 may be operated to provide torque to powertrain 200 or to convert powertrain torque into electrical energy to be stored in electrical energy storage device 132 in a regeneration mode. Additionally, electric machine 120 may convert the vehicle's kinetic energy into electrical energy for storage in electric energy storage device 132. Electric machine 120 is in electrical communication with energy storage device 132. Electric machine 120 has a higher output torque capacity than starter (e.g. 140) depicted in FIG. 1A, or BISG 142*a*. Further, electric machine 120 directly drives powertrain 200, or is directly driven by powertrain 200.

Electrical energy storage device 132 (e.g. high voltage battery or power source) may be a battery, capacitor, or inductor. Electric machine 120 is mechanically coupled to wheels 131 and dual clutch transmission via a gear set in rear drive unit 136 (shown in FIG. 1A). Electric machine 120 may provide a positive torque or a negative torque to powertrain 200 via operating as a motor or generator as instructed by electric machine controller 252.

Further, a frictional force may be applied to wheels 131 by engaging friction wheel brakes 218. In one example, friction wheel brakes 218 may be engaged in response to the driver pressing his foot on a brake pedal (e.g. 192) and/or in response to instructions within brake controller 141. Further, brake controller 141 may apply brakes 218 in response to information and/or requests made by vehicle system controller 12. In the same way, a frictional force may be reduced to wheels 131 by disengaging wheel brakes 218 in response to the driver releasing his foot from a brake pedal, brake controller instructions, and/or vehicle system controller instructions and/or information. For example, vehicle brakes may apply a frictional force to wheels 131 via controller 141 as part of an automated engine stopping procedure.

Vehicle system controller 12 may also communicate vehicle suspension settings to suspension controller 280. The suspension (e.g. 111) of vehicle 121 may be adjusted to critically damp, over damp, or under damp the vehicle suspension via variable dampeners 281.

Accordingly, torque control of the various powertrain components may be supervised by vehicle system controller 12 with local torque control for the engine 110, transmission 125, electric machine 120, and brakes 218 provided via engine controller 111B, electric machine controller 252, transmission controller 254, and brake controller 141.

As one example, an engine torque output may be controlled by adjusting a combination of spark timing, fuel pulse width, fuel pulse timing, and/or air charge, by controlling throttle (e.g. 62B) opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from electric machine 120 by adjusting current flowing to and from field and/or armature windings of electric machine 120 as is known in the art.

Transmission controller 254 may receive transmission output shaft torque from torque sensor 272. Alternatively, sensor 272 may be a position sensor or torque and position sensors. If sensor 272 is a position sensor, transmission controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 111B, and vehicle system controller 12, may also receive additional transmission information from sensors 277, which may include but are not limited to pump output line pressure sensors, transmission hydraulic pressure sensors (e.g., gear clutch fluid pressure sensors), motor temperature sensors, BISG temperatures, shift selector position sensors, synchronizer position sensors, and ambient temperature sensors. Transmission controller may also receive a requested transmission state (e.g., requested gear or park mode) from shift selector 279, which may be a lever, switches, or other device.

Brake controller 141 receives wheel speed information via wheel speed sensor 195 and braking requests from vehicle system controller 12. Brake controller 141 may also receive brake pedal position information from brake pedal sensor (e.g. 157) shown in FIG. 1A directly or over CAN 299. Brake controller 141 may provide braking responsive to a wheel torque command from vehicle system controller 12. Brake controller 141 may also provide anti-lock and vehicle stability braking to improve vehicle braking and stability. As such, brake controller 141 may provide a wheel torque limit (e.g., a threshold negative wheel torque not to be exceeded) to the vehicle system controller 12 so that negative motor torque does not cause the wheel torque limit to be exceeded. For example, if controller 12 issues a negative wheel torque limit of 50 N-m, motor torque may be adjusted to provide less than 50 N-m (e.g., 49 N-m) of negative torque at the wheels, including accounting for transmission gearing.

Positive torque may be transmitted to vehicle wheels 131 in a direction starting at engine 110 and ending at wheels 131. Thus, according to the direction of positive torque flow in driveline 200, engine 110 is positioned in driveline 200 upstream of transmission 125. Transmission 125 is positioned upstream of electric machine 120, and BISG 142*a* may be positioned upstream of engine 110, or downstream of engine 110 and upstream of transmission 125.

Figure 3A:
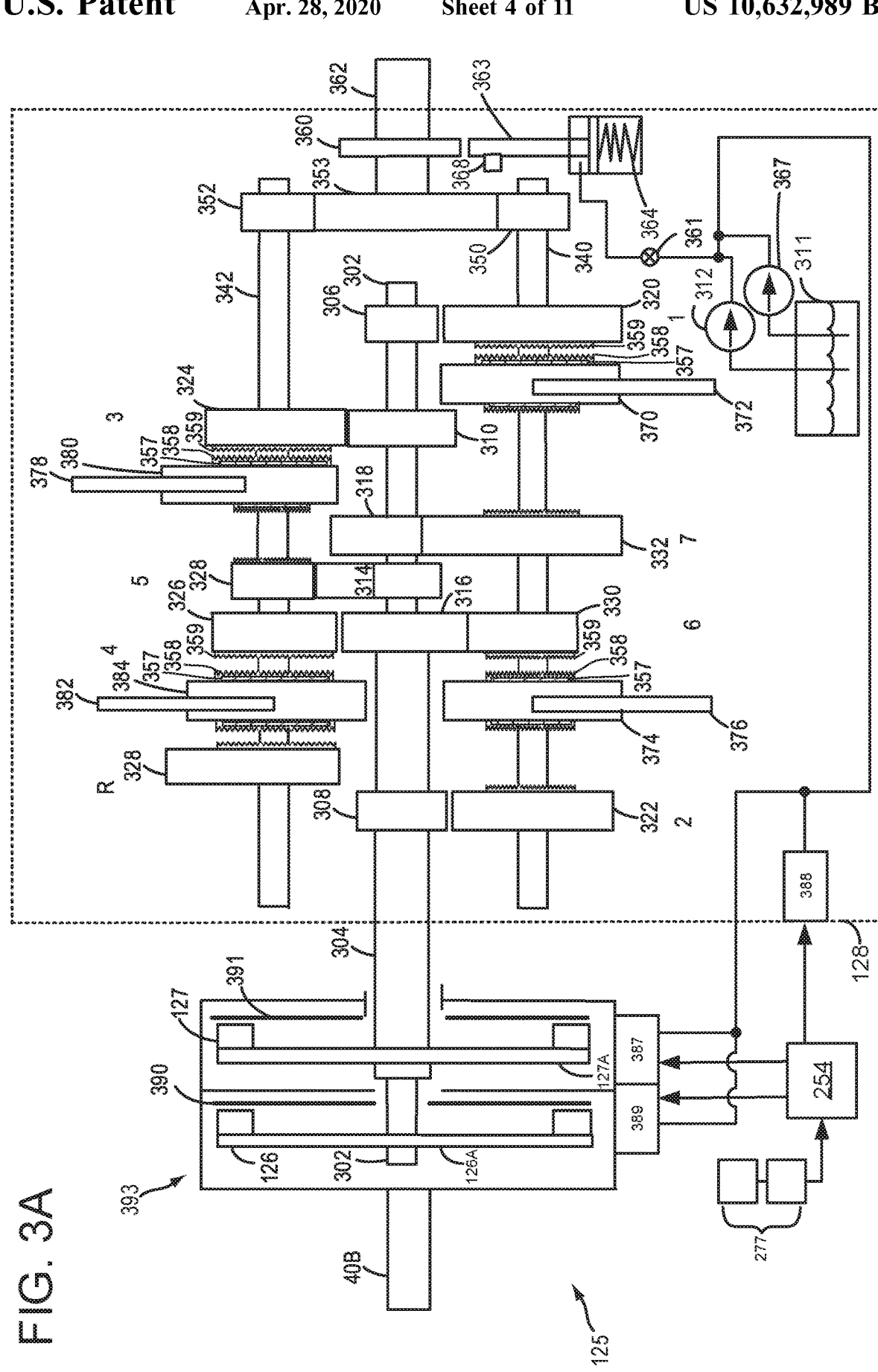
FIG. 3A is a schematic diagram of a dual clutch transmission that may be located in the hybrid vehicle driveline.
Figure 3B:
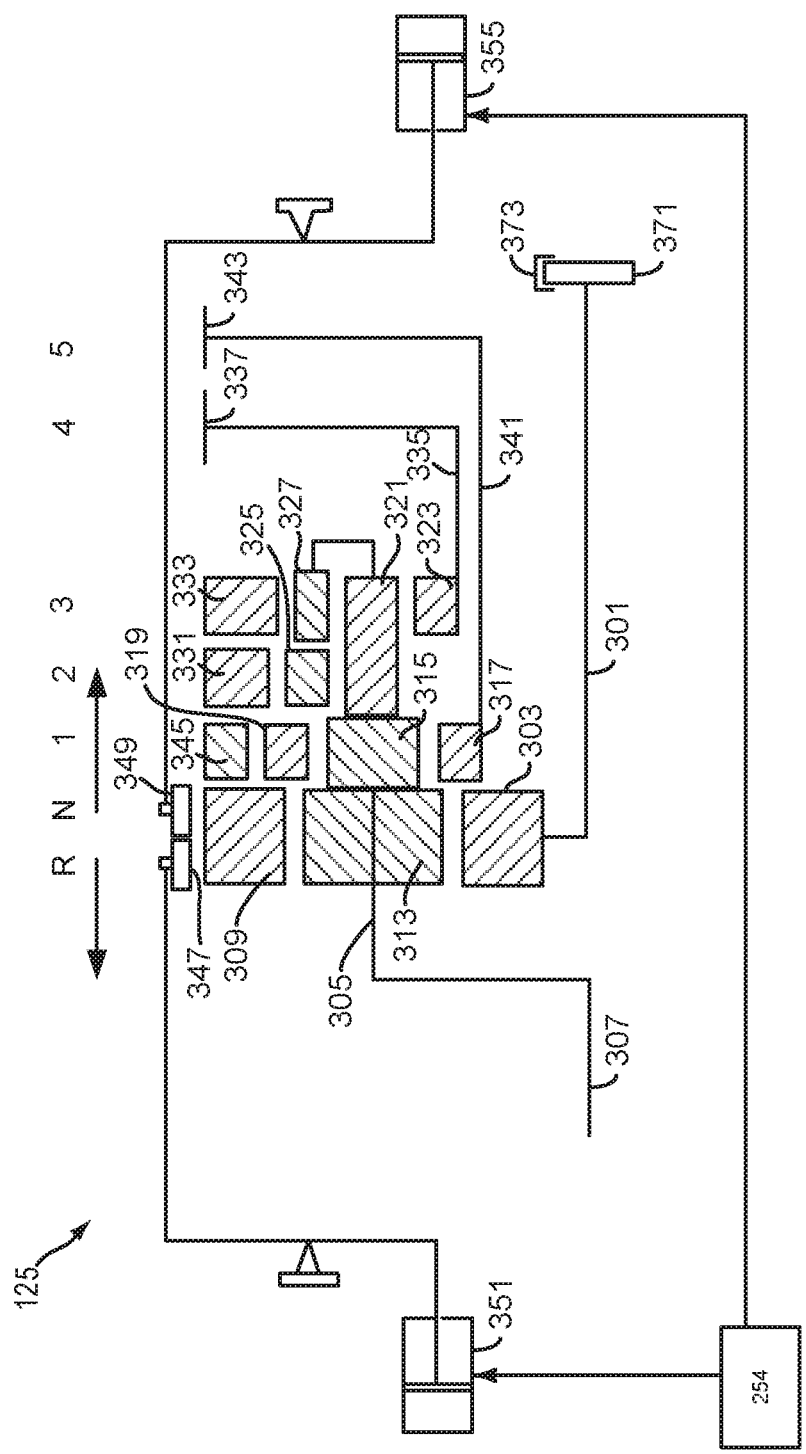
FIG. 3B is a schematic diagram of a planetary gear transmission that may be located in the hybrid vehicle driveline.

FIG. 3A shows a detailed illustration of a dual clutch transmission (DCT) 125. Engine crankshaft 40B is illustrated as coupling to a clutch housing 393. Alternatively, a shaft may couple crankshaft 40B to clutch housing 393. Clutch housing 393 may spin in accordance with rotation of crankshaft 40B. Clutch housing 393 may include a first clutch 126 and a second clutch 127. Furthermore, each of first clutch 126 and second clutch 127 have an associated first clutch plate 390, and a second clutch plate 391, respectively. In some examples, the clutches may comprise wet clutches, bathed in oil (for cooling), or dry plate clutches. Engine torque may be transferred from clutch housing 393 to either first clutch 126 or second clutch 127. First transmission clutch 126 transfers torque between engine 110 (shown in FIG. 1A) and first transmission input shaft 302. As such, clutch housing 393 may be referred to as an input side of first transmission clutch 126 and 126A may be referred to as an output side of first transmission clutch 126. Second transmission clutch 127 transfers torque between engine 110 (shown in FIG. 1A) and second transmission input shaft 304. As such, clutch housing 393 may be referred to as an input side of second transmission clutch 127 and 127A may be referred to as an output side of second transmission clutch 127.

A gear box 128 may include a plurality of gears, as discussed above. There are two transmission input shafts, including first transmission input shaft 302, and second transmission input shaft 304. Second transmission input shaft 304 is hollow, while first transmission input shaft 302 is solid, and sits coaxially within the second transmission input shaft 304. As an example, first transmission input shaft 302 may have a plurality of fixed gears. For example, first transmission input shaft 302 may include first fixed gear 306 for receiving first gear 320, third fixed gear 310 for receiving third gear 324, fifth fixed gear 314 for receiving fifth gear 329, and seventh fixed gear 318 for receiving seventh gear 332. In other words, first transmission input shaft 302 may be selectively coupled to a plurality of odd gears. Second transmission input shaft 304 may include second fixed gear 308 for receiving second gear 322, or a reverse gear 328, and may further include fourth fixed gear 316, for receiving either fourth gear 326 or sixth gear 330. It may be understood that both first transmission input shaft 302 and second transmission input shaft 304 may be connected to each of first clutch 126 and second clutch 127 via spines (not shown) on the outside of each shaft, respectively. In a normal resting state, each of first clutch 302 and second clutch 304 are held open, for example via springs (not shown), etc., such that no torque from engine (e.g. 110) may be transmitted to first transmission input shaft 302 or second transmission input shaft 304 when each of the respective clutches are in an open state. Responsive to closing first clutch 126, engine torque may be transmitted to first transmission input shaft 302, and responsive to closing second clutch 127, engine torque may be transmitted to second transmission input shaft 304. During normal operation, transmission electronics may ensure that only one clutch is closed at any given time.

Gear box 128 may further include a first layshaft shaft 340, and second layshaft shaft 342. Gears on first layshaft shaft 340 and second layshaft shaft 342 are not fixed, but may freely rotate. In example DCT 125, first layshaft shaft 340 includes first gear 320, second gear 322, sixth gear 330, and seventh gear 332. Second layshaft shaft 342 includes third gear 324, fourth gear 326, fifth gear 329, and reverse gear 328. Both first layshaft shaft 340 and second layshaft shaft 342 may transfer torque via a first output pinion 350, and a second output pinion 352, respectively, to gear 353. In this way, both layshafts may transfer torque via each of first output pinion 350 and second output pinion 352, to output shaft 362, where output shaft may transfer torque to a rear drive unit 136 (shown in FIG. 1A) which may enable each of the driven wheels (e.g. 131 of FIG. 1A) to rotate at different speeds, for example when performing turning maneuvers.

As discussed above, each of first gear 320, second gear 322, third gear 324, fourth gear 326, fifth gear 329, sixth gear 330, seventh gear 332, and reverse gear 328 are not fixed to layshafts (e.g. 340 and 342), but instead may freely rotate. As such, synchronizers may be utilized to enable each of the gears to match the speed of the layshafts, and may further be utilized to lock the gears. In example DCT 125, four synchronizers are illustrated, for example, first synchronizer 370, second synchronizer 374, third synchronizer 380, and fourth synchronizer 382. First synchronizer 370 includes corresponding first selector fork 372, second synchronizer 374 includes corresponding selector fork 376, third synchronizer 380 includes corresponding third selector fork 378, and fourth synchronizer 384 includes corresponding fourth selector fork 382. Each of the selector forks may enable movement of each corresponding synchronizer to lock one or more gears, or to unlock one or more gears. For example, first synchronizer 370 may be utilized to lock either first gear 320 or seventh gear 332. Second synchronizer 374 may be utilized to lock either second gear 322 or sixth gear 330. Third synchronizer 380 may be utilized to lock either third gear 324 or fifth gear 329. Fourth synchronizer 384 may be utilized to lock either fifth gear 326, or reverse gear 328. In each case, movement of the synchronizers may be accomplished via the selector forks (e.g. 372, 376, 378, and 382) moving each of the respective synchronizers to the desired position. Each of the synchronizers 370, 374, 380, and 384 includes synchronizer teeth 358 to engage with synchronizing teeth 359 of gears 320, 332, 322, 330, 324, 329, 326, and 328. Each of synchronizers 370, 374, 380, and 384 also include synchronizer friction elements 357, which equalize speed between the respective synchronizers and their corresponding gears. Thus, friction elements 357 may transfer torque between gears and synchronizers to equalize gear speed to transmission shaft speed.

Movement of synchronizers via selector forks may be carried out via transmission control module (TCM) 254 and shift fork actuators 388, where TCM 254 may comprise TCM 254 discussed above with regard to FIG. 2. Shift fork actuators may be operated electrically, hydraulically, or a combination of electric and hydraulic. Hydraulic power may be provided via pump 312 and/or pump 367. TCM 254 may collect input signals from various sensors, assess the input, and control various actuators accordingly. Inputs utilized by TCM 254 may include but are not limited to transmission range (P/R/N/D/S/L, etc.), vehicle speed, engine speed and torque, throttle position, engine temperature, ambient temperature, steering angle, brake inputs, gear box input shaft speed (for both first transmission input shaft 302 and second transmission input shaft 304), vehicle attitude (tilt). The TCM may control actuators via an open-loop control, to allow for adaptive control. For example, adaptive control may enable TCM 254 to identify and adapt to clutch engagement points, clutch friction coefficients, and position of synchronizer assemblies. TCM 254 may also adjust first clutch actuator 389 and second clutch actuator 387 to open and close first clutch 126 and second clutch 127. First clutch actuator 389 and second clutch actuator 387 may be operated electrically, hydraulically, or a combination of electric and hydraulic. Hydraulic power may be provided via pump 312 and/or pump 367.

As such TCM 254 is illustrated as receiving input from various sensors 277. As discussed above with regard to FIG. 2, the various sensors may include pump output line pressure sensors, transmission hydraulic pressure sensors (e.g. gear clutch fluid pressure sensors), motor temperature sensors, shifter position sensors, synchronizer position sensors, and ambient temperature sensors. The various sensors 277 may further include wheel speed sensors (e.g. 195), engine speed sensors, engine torque sensors, throttle position sensors, engine temperature sensors, steering angle sensors, and inertial sensors (e.g. 199). Inertial sensors may comprise one or more of the following: longitudinal, latitudinal, vertical, yaw, roll, and pitch sensors, as discussed above with regard to FIG. 1A.

Sensors 277 may further include an input shaft speed (ISS) sensor, which may include a magneto-resistive sensor, and where one ISS sensor may be included for each gear box input shaft (e.g. one for first transmission input shaft 302 and one for second transmission input shaft 304). Sensors 277 may further include an output shaft speed sensor (OSS), which may include a magneto-resistive sensor, and may be attached to output shaft 362. Sensors 277 may further include a transmission range (TR) sensor and fork position sensors to detect position of selector forks (e.g. 372, 376, 378, 382).

DCT 125 may be understood to function as described herein. For example, when first clutch 126 is actuated closed, engine torque may be supplied to first transmission input shaft 302. When first clutch 126 is closed, it may be understood that second clutch 127 is open, and vice versa. Depending on which gear is locked when first clutch 126 is closed, power may be transmitted via the first transmission input shaft 302 to either first layshaft 340 or second layshaft 342, and may be further transmitted to output shaft 362 via either first pinion gear 350 or second pinion gear 352. Alternatively, when second clutch 127 is closed, power may be transmitted via the second transmission input shaft 304 to either first layshaft 340 or second layshaft 342, depending on which gear is locked, and may be further transmitted to output shaft 362 via either first pinion gear 350 or second pinion gear 352. It may be understood that when torque is being transferred to one layshaft (e.g. first output shaft 340), the other layshaft (e.g. second output shaft 342) may continue to rotate even though only the one shaft is driven directly by the input. More specifically, the non-engaged shaft (e.g. second layshaft 342) may continue to rotate as it is driven indirectly by the output shaft 362 and respective pinion gear (e.g. 352).

DCT 125 may enable preselection of gears, which may thus enable rapid switching between gears with minimal loss of torque during shifting. As an example, when first gear 320 is locked via first synchronizer 370, and wherein first clutch 126 is closed (and second clutch 127 is open), power may be transmitted from the engine to first input shaft 302, and to first layshaft 340. While first gear 320 is engaged, second gear 322 may simultaneously be locked via second synchronizer 374. Because second gear 322 is locked, this may rotate second input shaft 304, where the second input shaft 304 is speed matched to the vehicle speed in second gear. In an alternative case where a gear is pre-selected on the other layshaft (e.g. second layshaft 342), that layshaft will also rotate as it is driven by output shaft 362 and pinion 352.

When a gear shift is initiated by TCM 254, only the clutches need to be actuated to open first clutch 126 and close second clutch 127. Furthermore, outside the TCM, engine speed may be lowered to match the upshift. With the second clutch 127 closed, power may be transmitted from the engine, to second input shaft 304, and to first layshaft 340, and may be further transmitted to output shaft 362 via pinion 350. Subsequent to the shifting of gears being completed, TCM 254 may pre-select the next gear appropriately. For example, TCM 254 may pre-select either a higher or a lower gear, based on input it receives from various sensors 277. In this way, gear changes may be achieved rapidly with minimal loss of engine torque provided to the output shaft 362.

Dual clutch transmission 300 may in some examples include a parking gear 360. A parking pawl 363 may face parking gear 360. When a shift lever is set to park, park pawl 363 may engage parking gear 360. Engagement of parking pawl 363 with parking gear 360 may be accomplished via a parking pawl spring 364, or may be achieved via a cable (not shown), a hydraulic piston (not shown) or a motor (not shown), for example. When parking pawl 363 is engaged with parking gear 360, driving wheels (e.g. 130, 131) of a vehicle may be locked. On the other hand, responsive to the shift lever being moved from park, to another selection (e.g. drive), parking pawl 363 may move such that parking pawl 363 may be disengaged from parking gear 360.

In some examples, an electric transmission pump 312 may supply hydraulic fluid from transmission sump 311 to compress spring 364, in order to release parking pawl 363 from parking gear 360. Electric transmission pump 312 may be powered by an onboard energy storage device (e.g. 132), for example. In some examples, a mechanical pump 367 may additionally or alternatively supply hydraulic fluid from transmission sump 311 to compress spring 364 to release parking pawl 363 from parking gear 360. While not explicitly illustrated, mechanical pump may be driven by the engine (e.g. 110), and may be mechanically coupled to clutch housing 393. A park pawl valve 361 may regulate the flow of hydraulic fluid to spring 364, in some examples.

Referring now to FIG. 3B, an example of a second type of transmission that may be included in driveline 200 is shown. In this example, a transmission with planetary gear set is shown.

Torque converter 371 may receive input torque from ISG 142 or engine 110 and torque converter clutch 373 may selectively lock a torque converter impeller (not shown) to a torque converter turbine (not shown). Torque may be transmitted from torque converter 371 to input shaft 301. Input shaft 301 is driveably connected to a sun gear 303 of a planetary or epicyclic gear unit. The carrier 305 of the gear unit is driveably connected to an output shaft 307, which drives the wheels of a motor vehicle.

The gear unit includes a ring gear 309 surrounding sun gear 303, and a first set of planet pinions 313 rotatably supported on carrier 305 in continuous meshing engagement with sun gear 303 and ring gear 309. Fixed to each of the pinions that comprise pinion set 313 is a planet pinion of the set 315, which is rotatably supported on carrier 305 in continuous meshing engagement with a second sun gear 317 and with each of the planet pinions that comprise a third set of pinions 319, also rotatably supported on carrier 305. Surrounding sun gear 317 and planet pinion sets 315, 319 is a second ring gear (not shown), which meshes with each pinion of the set 319.

Extending axially from, and fixed to each of the planet pinions that comprise pinion set 315 is a fourth set of planet pinions 321, rotatably supported on carrier 305 and in continuous meshing engagement with third sun gear 323. Each of the members of the planet pinion set 321 is in continuous meshing engagement with a member of fifth and sixth planet pinion sets 325, 327, respectively, which are also rotatably supported on carrier 305. Each member of planet pinion set 325 is in continuous meshing engagement with a third ring gear 331; each member of planet pinion set 327 is in continuous meshing engagement with a fourth ring gear 333.

Third sun gear 323 is driveably connected by a member 335 to a fourth speed brake drum 337, whose outer surface has substantially the same radius as that of the outer surfaces of ring gears 309, 331, and 333. Similarly, second sun gear 317 is driveably connected by a member 341 to a fifth speed brake drum 343, whose outer surface has substantially the same radius as that of the outer surfaces of the ring gears and brake drum 337. The outer surfaces of brake drums 337, 343 and ring gears 345, 309, 331, and 333 are mutually adjacent, aligned and located in a substantially circular cylindrical surface.

First second brake bands 347 and 349 are axial displaced. The first and second brake bands are actuated alternately to engage and release ring gears 345, 309, 331, 333 and brake drums 337, 343. When the ring gears and brake drums are engaged by the brake bands, they are held fixed against rotation because a rail that supports them is held fixed on the transmission casing against rotation. First gear results when ring gear 345 is held; second and third gears are produced when ring gears 331 and 333, respectively, are held; fourth and fifth gears are produced when sun gears 323 and 317, respectively, are held; and reverse gear results when ring gear 309 is held. Brake bands 347 and 349 may be selectively applied and released via hydraulic servos 351 and 355, which may be controlled via transmission controller 254.

Thus, the system of FIGS. 1A-3B provides for a system, comprising: a first electric machine; a transmission selectively mechanically coupled to the first electric machine via an input clutch; a second electric machine included in a rear drive unit, the rear drive unit mechanically coupled to an output shaft of the transmission; and a controller including executable instructions stored in non-transitory memory to operate the second electric machine in a speed control mode while changing an output torque of the first electric machine while an input clutch and a gear clutch of the transmission are closed, and instructions to operate the transmission responsive to current supplied to the first electric machine and the second electric machine immediately before changing the output torque of the first electric machine and current supplied to the first electric machine and the second electric machine immediately after changing the output torque of the first electric machine.

In some examples, the system further comprises operating the transmission with a closed input clutch and a closed gear clutch. The system further comprises estimating a transmission torque ratio responsive to the current supplied to the first electric machine and the second electric machine immediately before changing the output torque of the first electric machine and the current supplied to the first electric machine and the second electric machine immediately after changing the output torque of the first electric machine. The system includes where instructions to operate the transmission responsive to current includes shifting transmission gears. The system includes where operating the second electric machine in a speed control mode includes maintaining a constant vehicle speed. The system further comprises estimating transmission efficiency from the current supplied to the first electric machine and the second electric machine immediately before changing the output torque of the first electric machine and the current supplied to the first electric machine and the second electric machine immediately after changing the output torque of the first electric machine.

Referring now to FIG. 4, a first example method for operating a hybrid driveline to determine transmission control parameters is shown. The method of FIG. 4 may operate in cooperation with the methods of FIGS. 6 and 8. Further, the method of FIG. 4 may be incorporated into and may cooperate with the system of FIGS. 1A-3B. Further, at least portions of the method of FIG. 4 may be incorporated as executable instructions stored in non-transitory memory while other portions of the method may be performed via a controller transforming operating states of devices and actuators in the physical world.

At 402, method 400 judges if transmission output torque characterization is desired. Transmission output torque characterization may be desired after the vehicle in which the transmission operates has been driven a predetermined distance or amount of time. If method 400 judges that transmission output torque characterization is desired, the answer is yes and method 400 proceeds to 404. Otherwise, the answer is no and method 400 proceeds to 450.

At 450, method 400 operates the transmission with the latest transmission output torque characterization values. For example, if the vehicle has just left the factory where it was made, the transmission is operated with factory installed values for transfer functions that describe torque ratios for the various transmission gears. Method 400 proceeds to exit.

At 404, method 400 judges if driver demand vehicle acceleration is less than (L.T.) a threshold. In one example, a driver demand vehicle acceleration may be determined via accelerator pedal position and vehicle speed indexing or referencing a table or function of empirically determined vehicle acceleration values. If method 400 judges that driver demand vehicle acceleration is less than a threshold, the answer is yes and method 400 proceeds to 406. Otherwise, the answer is no and method 400 proceeds to 450.

At 406, method 400 judges if at least one transmission input shaft is mechanically coupled to the ISG or the engine crankshaft. Further, method may require that a driveline disconnect clutch is fully closed if the driveline includes a disconnect clutch and the transmission is to be driven via the BISG. If method 400 judges that at least one transmission input shaft is mechanically coupled to the engine crankshaft, the answer is yes and method 400 proceeds to 408. Alternatively, if at least one transmission input shaft is mechanically coupled to an ISG and the ISG is driving the transmission, the answer is yes and method 400 proceeds to 408. Otherwise, the answer is no and method 400 proceeds to 450. In addition, if the hybrid driveline includes a planetary gear set, method 400 may require that a torque converter clutch is fully closed to mechanically couple the engine crankshaft to a transmission input shaft. Method 400 may also require that one or more gear clutches be closed and a gear be fully engaged before proceeding to 408.

At 408, method 400 operates the electric machine included in the rear drive unit in a speed control mode with its reference speed or desired speed based on driver demand acceleration. The electric machine follows a reference speed when operated in a speed control mode. Torque of the electric machine may be increased or decreased so that speed of the electric machine follows the reference speed. Torque of the electric machine may be increased by increasing current supplied to the electric machine. Torque of the electric machine may be decreased by decreasing current supplied to the electric machine. The reference speed may be a constant speed when the driver demand acceleration is zero. In one example, the reference speed may be determined via a function or table that includes empirically determined vehicle acceleration values that are a function of driver demand vehicle acceleration. The electric machine included in the rear drive unit or the rear drive unit electric machine is commanded to the reference speed in a speed control mode. Method 400 proceeds to 410.

At 410, method 400 stores present ISG, BISG, and rear drive unit electric machine torque to controller memory. The ISG electric machine torque may be estimated responsive to current supplied to the ISG and ISG speed. In one example, ISG speed and current index or reference a function that outputs empirically determined values of ISG torque. BISG torque and rear drive unit electric machine torque may be determined in a similar way. After the electric machine torques are stored to memory and without further adjusting torque of the ISG, BISG, and rear drive unit electric machine, method 400 commands an increase or decrease in ISG or BISG torque. Method 400 then determines an amount of ISG, BISG, and rear drive unit electric machine torque values immediately after driveline operating conditions have stabilized after the torque increase or decrease has been performed, the ISG, BISG, and rear drive unit electric machine torques responsive to or based on ISG, BISG, and rear drive unit electric machine current.

The increase or decrease in ISG or BISG torque may be restricted to a value that is less than an amount that may be compensated by the rear drive unit electric machine. For example, if the transmission engaged in a present gear has a ratio of 4 to 1, the rear drive unit electric machine has a torque output capacity of 200 N-m, and the rear drive unit electric machine is presently outputting 100 N-m, the ISG or BISG torque may be decreased a maximum of 25 N-m so that the rear drive unit electric machine may provide the torque previously provided by the ISG or BISG to the transmission input so that vehicle acceleration may be maintained at the driver demanded vehicle acceleration. In other words, the ISG or BISG torque decrease is transmitted to the transmission output shaft as a torque decrease of 100 N-m and the torque loss may be compensated by increasing rear drive unit electric machine torque output to the rear drive unit so that the rear drive unit provides its maximum torque of 200 N-m. Conversely, if the ISG or BISG torque is increased, rear drive unit electric machine torque may be decreased in a similar way to maintain vehicle acceleration at the driver demand vehicle acceleration.

At 412, method 400 determines a change in rear drive unit electric machine torque output to maintain the desired driver demand vehicle acceleration. Since the rear drive unit electric machine is in speed control mode, rear drive unit electric machine torque changes in response to the ISG or BISG torque adjustment to maintain the driver demand vehicle acceleration. The change in rear drive unit electric machine torque may be determined by subtracting the rear drive unit electric machine torque output immediately before the ISG or BISG torque change from the rear drive unit electric machine torque output immediately after the ISG or BISG torque change and taking the absolute value of the result. For example, if before the ISG or BISG torque is changed the rear drive unit electric machine output torque is 100 N-m, and after the ISG or BISG torque change, the rear drive unit electric machine torque is 200 N-m, the rear drive unit torque change is 100 N-m.

Method 400 may also determine the torque change of the ISG or BISG by subtracting the ISG or BISG torque output immediately before the ISG or BISG torque change from the ISG or BISG torque immediately after the ISG or BISG torque and taking the absolute value of the result. For example, if ISG or BISG torque is 50 N-m before the ISG or BISG torque change and 25 N-m after the ISG or BISG torque change, the ISG or BISG torque change is 25 N-m. Method 400 proceeds to 414.

At 414, method 400 determines the present transmission torque ratio for the presently engaged transmission gear. A transmission gear change is not permitted when characterizing transmission output torque, but instead, method 400 may exit if a transmission gear shift is requested while method 400 is activated. In one example, method 400 determines the transmission torque ratio for the present gear by dividing the change in transmission output torque, which is equal to the change in rear drive unit electric machine torque determined at 412, by the change in transmission input torque, which is equal to the change in ISG or BISG torque determined at 412. For example, if the rear drive unit electric machine torque changed by 100 N-m and the ISG or BISG torque changed by 25 N-m, the transmission torque ratio is four. The transmission efficiency may be estimated by dividing the rear drive unit electric machine torque after the ISG or BISG torque adjustment by the ISG or BISG torque after the ISG or BISG torque adjustment divided by the gear ratio of the presently engaged gear. Method 400 proceeds to 416.

At 416, method 400 revises values of transmission torque ratio and transmission efficiency stored in controller memory using values determined at 414. Further, method 400 adjusts transmission shifting according to the revised transmission torque ratio. In one example, method 400 adjusts transmission input torque during a gear shift according to the following equation:

$$Tq_{Tm\_inst\_max} = \frac{1}{2} \cdot \left(Tq_{Tm\_in\_newgear} + \frac{RT_{gear\_old}}{RT_{gear\_new}} \cdot Tq_{Tm\_in\_oldgear}\right) -$$

-continued
$$J_{Tm\_in} \cdot \omega_{Tm\_out} \cdot \left(\frac{RT_{gear\_old} - RT_{gear\_new}}{RT_{shft\_dur}}\right)$$

where $Tq_{Tm\_inst\_max}$ is the transmission input maximum instantaneous torque limit, $Tq_{Tm\_in\_newgear}$ is the transmission input torque in the new gear immediately after the on-coming clutch fully closes, $RT_{gear\_new}$ is the torque ratio of the transmission while engaged in the new gear (e.g., an adapted value), $RT_{gear\_old}$ is the torque ratio of the transmission while engaged in the old gear (e.g., and adapted value), $Tq_{Tm\_in\_oldgear}$ is the transmission input torque in the old gear immediately before the off-going clutch begins to be released during the present gear shift, $J_{Tm\_in}$ is the transmission effective input inertia, $\omega_{Tm\_out}$ is the transmission output shaft angular speed, and $T_{shft\_dur}$ is the duration of the shift or gear ratio change. Further, engine torque and ISG torque may be adjusted to provide a desired wheel torque compensating for transmission efficiency. Method 400 proceeds to exit after operating the transmission with adjusted control parameters.

In this way, the adapted transmission control parameters may be used to adjust transmission input torque during transmission shifting. The adjustments may improve shifting consistency and feel. Further, adjustments to ISG torque and engine torque for transmission efficiency may provide improve wheel torque output.

Referring now to FIG. 5, a prophetic transmission output torque characterization sequence according to the method of FIG. 4 is shown. The sequence of FIG. 5 may be provided via the method of FIG. 4 operating in conjunction with the system of FIGS. 1A-3B. The data in the plots of FIG. 5 occur at the same time and the plots are aligned in time. Vertical markers at times T0-T6 represent times of interest during the sequence.

The first plot from the top of FIG. 5 is a plot of transmission torque characterization state versus time. The transmission torque characterization state is active when trace 502 is at a higher level near the vertical axis arrow. The transmission torque characterization state is not active when trace 502 is at a lower level near the vertical axis arrow. The horizontal axis represents time and time increases from the left side of the figure to the right side of the figure.

The second plot from the top of FIG. 5 is a plot of driver demand torque versus time. The vertical axis represents driver demand torque and driver demand torque increases in the direction of the vertical axis arrow. The horizontal axis represents time and time increases from the left side of the figure to the right side of the figure.

The third plot from the top of FIG. 5 is a plot of rear drive unit electric machine torque versus time. The vertical axis represents rear drive unit electric machine torque and rear drive unit electric machine torque increases in the direction of the vertical axis arrow. The horizontal axis represents time and time increases from the left side of the figure to the right side of the figure.

The fourth plot from the top of FIG. 5 is a plot of ISG or BISG torque versus time. The vertical axis represents ISG or BISG torque and ISG or BISG torque increases in the direction of the vertical axis arrow. The horizontal axis represents time and time increases from the left side of the figure to the right side of the figure.

At time T0, the transmission torque characterization state is not asserted so the transmission torque ratio and efficiency are not being requested to be determined and revised. The driver demand torque is constant so the requested vehicle acceleration is zero. The rear drive unit electric machine torque is a constant middle level and the ISG or BISG torque is zero.

At time T1, the transmission torque characterization state changes from a low value to a high value to request characterization of transmission torque and efficiency. The driver demand torque, rear drive unit electric machine torque, and BISG or ISG torque values remain at their previous levels.

Between time T1 and time T2, the ISG or BISG torque is determined from ISG or BISG electrical current and the rear drive unit electric machine torque is determined from rear drive unit electric machine electric current (not shown). Both torque values are stored to memory. The driver demand torque remains constant, the rear drive unit electric machine torque remains constant and the ISG or BISG torque remains constant. The transmission torque characterization state remains asserted.

At time T2, the ISG or BISG torque output is increased in a step-wise manner. The rear drive unit electric machine torque is reduced in a step-wise manner in response to the increase in ISG or BISG torque. By decreasing the rear drive unit electric machine torque in response to the increase in ISG or BISG torque, vehicle speed may remain substantially constant (e.g., vary by less than 5%). The transmission torque characterization state remains asserted and the driver demand torque remains constant.

Between time T2 and time T3, the ISG or BISG torque is determined from ISG or BISG electrical current and the rear drive unit electric machine torque is determined from rear drive unit electric machine electric current (not shown). Both torque values are stored to memory. The driver demand torque remains constant, the rear drive unit electric machine torque remains constant and the ISG or BISG torque remains constant. The transmission torque characterization state remains asserted. Once the ISG or BISG torque and the rear drive unit electric machine torque values are determined, the transmission torque ratio and the transmission efficiency are determined as described at 414 of FIG. 4 and stored to controller memory.

At time T3, the ISG or BISG torque output is decreased in a step-wise manner. The rear drive unit electric machine torque is increased in a step-wise manner in response to the decrease in ISG or BISG torque. By increasing the rear drive unit electric machine torque in response to the decrease in ISG or BISG torque, vehicle speed may remain substantially constant (e.g., vary by less than 5%). The ISG or BISG torque is changed to zero. The transmission torque characterization state remains asserted and the driver demand torque remains constant.

Between time T3 and time T4, the ISG or BISG torque remains constant as does the driver demand torque and the rear drive unit electric machine torque. The transmission torque characteristic state remains asserted.

At time T4, the ISG or BISG torque is increased in a ramp like fashion and the rear drive unit electric machine torque is decreased in a ramp like fashion to cancel out the ISG torque increase and maintain vehicle speed. The driver demand torque remains constant and the transmission torque characterization state remains asserted.

Between time T4 and time T5, the ISG or BISG torque is determined from ISG or BISG electrical current each time the ISG or BISG torque is increased and the rear drive unit electric machine torque is determined from rear drive unit electric machine electric current (not shown) each time the ISG or BISG torque is increased. Both torque values are stored to memory. The driver demand torque remains constant, the rear drive unit electric machine torque remains constant and the ISG or BISG torque remains constant. The transmission torque characterization state remains asserted. Each time the ISG or BISG torque and the rear drive unit electric machine torque values are determined, the transmission torque ratio and the transmission efficiency are determined as described at 414 of FIG. 4. The transmission torque ratios and transmission efficiencies may be averaged and stored to controller memory as an alternative to the method described from T1 to T2.

At time T5, the BISG or ISG torque is reduced to zero and the rear drive unit electric machine torque returns to its value just before time T4. The driver demand torque remains constant and the transmission torque characterization state remains asserted.

At time T6, the transmission torque characterization state transitions to a low state to indicate that transmission torque characterization is not being performed. The driver demand torque remains constant and the rear drive unit electric machine torque and the ISG or BISG torque remain at their previous values.

In this way, transmission torque ratio characterization and efficiency characterization may be performed with reduced possibility of disturbing vehicle occupants. In addition, the characterization may be determined after a step response, a ramp response, or while ISG or BISG torque is held constant (not shown).

Referring now to FIG. 6, a second example method for operating a hybrid driveline to determine transmission control parameters is shown. The method of FIG. 6 may operate in cooperation with the methods of FIGS. 4 and 8. Further, the method of FIG. 6 may be incorporated into and may cooperate with the system of FIGS. 1A-3B. Further, at least portions of the method of FIG. 6 may be incorporated as executable instructions stored in non-transitory memory while other portions of the method may be performed via a controller transforming operating states of devices and actuators in the physical world.

At 602, method 600 judges if transmission input clutch (e.g., 126 or 127 of FIG. 3A) characterization is desired. Transmission input clutch characterization may be desired after the vehicle in which the transmission operates has been driven a predetermined distance or amount of time or in response to an actual total number of gear shifts since the vehicle was manufactured. If method 600 judges that transmission input clutch characterization is desired, the answer is yes and method 600 proceeds to 604. Otherwise, the answer is no and method 600 proceeds to 650.

At 650, method 600 operates the transmission with the latest transmission input clutch torque characterization values. For example, if the vehicle has just left the factory where it was made, the transmission is operated with factory installed values for transfer functions that describe operation of the transmission input clutch. Method 600 proceeds to exit.

At 604, method 600 judges if transmission input clutches are open and if the transmission is locked in a gear (e.g., a synchronizer has locked a gear to a transmission shaft). In one example, transmission input clutches may be determined open and a gear is locked in response to actuator sensors in the transmission. By locking the transmission in gear, torque may be transferred to or from the engine and ISG or BISG to vehicle wheels when the input clutch is at least partially closed so that torque may be transferred across the transmission input clutch. If method 600 judges that transmission input clutches are open and the transmission is locked in a gear, the answer is yes and method 600 proceeds to 606. Otherwise, the answer is no and method 600 proceeds to 650.

At 606, method 600 judges if engine torque is low enough for ISG or BISG torque to control engine speed in a speed control mode. In one example, method 600 may judge that engine torque is low enough to control engine speed via the ISG or BISG when engine torque is less than a threshold torque. If method 600 judges that engine torque is low enough for ISG or BISG torque to control engine speed in a speed control mode, the answer is yes and method 600 proceeds to 608. Otherwise, the answer is no and method 600 proceeds to 650.

At 608, method 600 operates the ISG or BISG in a speed control mode with its reference speed based on driver demand acceleration. Further, the engine is commanded to a constant torque in a torque control mode. In torque control mode, speed of the engine is allowed to vary while engine torque is controlled to a reference value (e.g., a constant). Thus, the engine may increase from a speed of 1000 RPM to a speed of 1200 RPM if load on the engine decreases and the engine is outputting a constant torque value. By commanding the ISG or BISG to a constant speed and the engine to a constant torque, engine and ISG or BISG speed may be maintained constant.

In addition, method 600 may command the rear drive unit electric machine to a reference speed (e.g., a constant speed) in a speed control mode, the reference speed of the rear drive unit different from the reference speed of the ISG or BISG, and the reference speed of the rear drive unit not a transmission gear ratio multiple of the ISG reference speed. The reference speed of the rear drive unit may be greater than or less than the ISG reference speed. By operating the ISG or BISG at a different speed than the rear drive unit electric machine, closing the transmission input clutch may transfer torque from the ISG or BISG to the rear drive unit electric machine or vice-versa so that torque transferred through the transmission input clutch may be determined. Alternatively, the transmission may be placed in park with the gear engaged to resist torque transferred via the transmission input clutch. In still other examples, the output shaft of the transmission may be locked in a fixed position via applying vehicle brakes while the gear is locked so that torque transferred by the transmission input clutch is grounded. Method 600 determines the ISG or BISG torque after the ISG or BISG enters speed control mode and stores the torque value to memory. Method 600 proceeds to 610.

At 610, method 600 applies the transmission input clutch a predetermined amount. In one example, a position of a transmission input clutch is adjusted in response to a desired transmission input clutch torque (e.g., an amount of torque the clutch may transfer at a given clutch position). The desired transmission input clutch torque may be based on a shifting profile or transfer function (e.g., a table or function that relates transmission input clutch position to an amount of torque that may be transferred via the transmission input clutch) stored in controller non-transitory memory and the transmission input clutch may be adjusted to a position responsive to a transfer function that relates desired transmission input clutch torque to transmission input clutch position. For example, a table or function stored in non-transitory or transitory memory may hold transmission input clutch positions, and the table or function may output a transmission input clutch position in response to a desired transmission input clutch torque that references or indexes the table or function. The table or function may store a plurality of transmission input clutch positions that may be individually referenced by different desired transmission input clutch torque values. The transmission input clutch may be adjusted to each of the transmission clutch positions in the table or function to correct and/or verify that the transmission input clutch is transferring the amount of torque in the table or function corresponding to each transmission input clutch positions. Method 600 commands the transmission input clutch to one of the positions in the table or function then proceeds to 612.

At 612, method 600 determines an amount of torque transferred via the transmission input clutch to the transmission output shaft. In one example, method 600 determines a change in the ISG or BISG torque by subtracting ISG or BISG torque at a time immediately before closing the transmission input clutch from ISG or BISG torque immediately after closing the transmission input clutch to the position that is supposed to provide the desired transmission input clutch torque and transmission input clutch position stabilizes (e.g., changes by less than 5%). The ISG or BISG torque before the transmission input clutch is closed and after the transmission input clutch is closed may be determined in response to ISG or BISG current. For example, a current of 0.5 amperes may correspond to a ISG or BISG torque of 10 N-m. Method determines the change in ISG or BISG current by subtracting the ISG or BISG current before closing the transmission input clutch from the ISG or BISG current after closing the transmission input clutch. The change in ISG or BISG torque is the amount of torque transferred by the transmission input clutch. If the amount of torque transferred by the transmission input clutch as determined from ISG or BISG current does not equal the torque value in the table or function (e.g., the transmission input clutch transfer function), the value in the table that corresponds to the transmission input clutch's present position is revised with the torque determined from the ISG or BISG current. For example, if the transmission input clutch is closed to a position six millimeters from a fully open transmission input clutch position that is supposed to have a transmission input clutch torque value of 40 N-m, but ISG torque or BISG torque as determined from ISG or BISG current indicates 35 N-m of torque transferred via the transmission input clutch, then the table or function in memory updates the six millimeter position in the table or function with a value of 35 N-m. Method 600 proceeds to 614 after applying the transmission input clutch to a specified position.

At 614, method 600 judges whether or not all values in the function or table describing operation of the transmission input clutch (e.g., the transmission input clutch transfer function) have been corrected or verified. For example, if the function or table includes ten pairs of values describing transmission input clutch operation and nine of the pairs of values have been corrected or verified, the answer is not and method 600 proceeds to 620. However, if ten pairs of values have been corrected or verified, the answer is yes and method 600 proceeds to 616.

At 620, method 600 adjusts the position of the transmission input clutch to new position, the new position may be a position included in the table or function that describes transmission input clutch torque responsive to transmission input clutch position. For example, if the function or table includes a transmission input clutch position of 5 mm and a position of 7 mm and the transmission input clutch has already been moved to the 5 mm position, then the transmission input clutch is moved to the 7 mm position. Method 600 returns to 612.

It should be mentioned that if vehicle operating conditions cause method 600 to exit without having adapted, adjusted, or verified all positions in the table or function describing transmission input clutch operation, method 600 may resume adapting values in the table or function at a later time beginning with values in the table or function that were not previously adjusted or verified.

At 616, method 600 operates the transmission input clutch according to the table or function that describes transmission input clutch operation, including any values that may have been adjusted. For example, if it is desired that the transmission input clutch transfer 200 N-m of torque, the transmission input clutch is adjusted to a positon that corresponds to the transmission input clutch being able to transfer 200 N-m of torque. Method 600 proceeds to exit.

In this way, operation and control of the transmission input clutch may be adjusted and the values that describe transmission input clutch in a table or function may be revised as the vehicle and the transmission input clutches age. Each of the transmission input clutches may have a separate function or table that describes their operation and method 600 may be the basis for adjusting functions or tables for each of the transmission input clutches.

Referring now to FIG. 7, a prophetic transmission output torque characterization sequence according to the method of FIG. 6 is shown. The sequence of FIG. 7 may be provided via the method of FIG. 6 operating in conjunction with the system of FIGS. 1A-3B. The data in the plots of FIG. 7 occur at the same time and the plots are aligned in time. Vertical markers at times T10-T16 represent times of interest during the sequence.

The first plot from the top of FIG. 7 is a plot of transmission input clutch characterization state versus time. The transmission input clutch characterization state is active when trace 702 is at a higher level near the vertical axis arrow. The transmission input clutch characterization state is not active when trace 702 is at a lower level near the vertical axis arrow. The horizontal axis represents time and time increases from the left side of the figure to the right side of the figure.

The second plot from the top of FIG. 7 is a plot of driver demand torque versus time. The vertical axis represents driver demand torque and driver demand torque increases in the direction of the vertical axis arrow. The horizontal axis represents time and time increases from the left side of the figure to the right side of the figure.

The third plot from the top of FIG. 7 is a plot of rear drive unit electric machine torque versus time. The vertical axis represents rear drive unit electric machine torque and rear drive unit electric machine torque increases in the direction of the vertical axis arrow. The horizontal axis represents time and time increases from the left side of the figure to the right side of the figure.

The fourth plot from the top of FIG. 7 is a plot of ISG or BISG torque versus time. The vertical axis represents ISG or BISG torque and ISG or BISG torque increases in the direction of the vertical axis arrow. The horizontal axis represents time and time increases from the left side of the figure to the right side of the figure.

The fifth plot from the top of FIG. 7 is a plot of transmission input clutch torque (e.g., an amount of torque the transmission input clutch may transfer as presently applied) versus time. The vertical axis represents transmission input clutch torque and transmission input clutch torque increases in the direction of the vertical axis arrow. The horizontal axis represents time and time increases from the left side of the figure to the right side of the figure.

At time T10, the transmission input clutch torque characterization state is not asserted so transmission input clutch positioning is not being requested to be determined and revised. The driver demand torque is constant. The rear drive unit electric machine torque is a constant middle level and the ISG or BISG torque is a lower level. The transmission input clutch torque is zero indicating that the transmission input clutch is fully open.

At time T11, the transmission input clutch torque characterization state changes from a low value to a high value to request characterization of transmission input clutch torque. The driver demand torque, rear drive unit electric machine torque, and BISG or ISG torque values remain at their previous levels. Further, the transmission input clutch torque remains at zero. The ISG or BISG is placed in a speed control mode as is the rear drive unit electric machine (not shown).

Between time T11 and time T12, the ISG or BISG torque is determined from ISG or BISG electrical current and the rear drive unit electric machine torque is determined from rear drive unit electric machine electric current (not shown). Both torque values are stored to memory. The driver demand torque remains constant, the rear drive unit electric machine torque remains constant and the ISG or BISG torque remains constant. The transmission input clutch torque characterization state remains asserted.

At time T12, the transmission input clutch torque is increased in a step-wise manner by at least partially closing the transmission input clutch so that the transmission input clutch begins to transfer torque. The ISG or BISG torque increases to maintain ISG or BISG speed and engine speed. In this example, the transmission input shaft speed is less than the ISG or BISG speed. The rear drive unit electric machine torque is reduced in a step-wise manner in response to torque being transferred from the ISG or BISG to the transmission. By decreasing the rear drive unit electric machine torque in response to the transmission input clutch torque, vehicle speed may remain substantially constant (e.g., vary by less than 5%). The transmission input clutch torque characterization state remains asserted and the driver demand torque remains constant. The BISG or ISG torque change is compared to the commanded input clutch torque change, if there is a difference, the table or function describing transmission input clutch operation is revised with the torque determined via the BISG or ISG (not shown).

At time T13, the transmission input clutch torque is increased a second time in a step-wise manner. The rear drive unit electric machine torque is decreased in a step-wise manner in response to the increase in transmission input clutch torque, which increases torque input to the transmission. Further, the ISG or BISG torque is increased in a step-wise manner to maintain engine and ISG or BISG speed. By decreasing the rear drive unit electric machine torque in response to the increase in transmission input clutch torque, vehicle speed may remain substantially constant (e.g., vary by less than 5%). The transmission input clutch torque characterization state remains asserted and the driver demand torque remains constant.

At time T14, the transmission input clutch torque is decreased to zero in a step-wise fashion and the BISG or ISG torque is decreased in response to the decrease in transmission input clutch torque being reduced so that engine and ISG speed may be maintained. The driver demand torque remains constant and the transmission input clutch torque characterization state remains asserted. The rear drive unit electric machine torque is also increased in response to the decrease in transmission input clutch torque so that vehicle speed may be maintained.

At time T15, the transmission input clutch torque characterization state transitions to a low state to indicate that transmission input clutch torque characterization is not being performed. The driver demand torque remains constant and the rear drive unit electric machine torque and the ISG or BISG torque remain at their previous values. The transmission input clutch torque value also remains at zero.

In this way, transmission input clutch operation may be characterized and a transfer function describing transmission input clutch operation may be adapted or adjusted. The transmission input clutch transfer function may be adjusted as the vehicle ages so that the vehicle continues to shift consistently over time.

Referring now to FIG. 8, a third example method for operating a hybrid driveline to determine transmission control parameters is shown. The method of FIG. 8 may operate in cooperation with the methods of FIGS. 4 and 6. Further, the method of FIG. 8 may be incorporated into and may cooperate with the system of FIGS. 1A-3B. Further, at least portions of the method of F. 8 may be incorporated as executable instructions stored in non-transitory memory while other portions of the method may be performed via a controller transforming operating states of devices and actuators in the physical world.

At 802, method 800 judges if transmission shifting element (e.g., synchronizer friction elements, synchronizer teeth, synchronizing teeth of gears, and brake bands) characterization is desired. Transmission shifting element characterization may be desired after the vehicle in which the transmission operates has been driven a predetermined distance or amount of time or in response to an actual total number of gear shifts since the vehicle was manufactured. If method 800 judges that transmission input clutch characterization is desired, the answer is yes and method 800 proceeds to 804. Otherwise, the answer is no and method 800 proceeds to 850.

At 850, method 400 operates the transmission with the latest transmission shift element torque characterization values. For example, if the vehicle has just left the factory where it was made, the transmission is operated with factory installed values for transfer functions that describe torque transfer of the transmission shift elements. Method 800 proceeds to exit.

At 804, method 800 judges if transmission input clutches are open and if the transmission output shaft is locked. In one example, transmission clutches may be determined open and a gear is locked in response to actuator sensors in the transmission. By locking the transmission output shaft, torque transferred from a transmission input shaft to the transmission output shaft may be determined. If method 600 judges that transmission input clutches are open and the transmission output shaft is locked in a fixed position so as to not rotate, the answer is yes and method 800 proceeds to 806. Otherwise, the answer is no and method 800 proceeds to 850.

At 806, method 800 judges if engine torque is low enough for ISG or BISG torque to control engine speed in a speed control mode. In one example, method 800 may judge that engine torque is low enough to control engine speed via the ISG or BISG when engine torque is less than a threshold torque. If method 800 judges that engine torque is low enough for ISG or BISG torque to control engine speed in a speed control mode, the answer is yes and method 800 proceeds to 808. Otherwise, the answer is no and method 800 proceeds to 850.

At 808, method 800 operates the ISG or BISG in a speed control mode with its reference speed based on driver demand acceleration. Further, the engine is commanded to a constant torque in a torque control mode. In torque control mode, speed of the engine is allowed to vary while engine torque is controlled to a reference value (e.g., a constant). Thus, the engine may increase from a speed of 1000 RPM to a speed of 1200 RPM if load on the engine decreases and the engine is outputting a constant torque value. By commanding the ISG or BISG to a constant speed and the engine to a constant torque, engine and ISG or BISG speed may be maintained constant. By operating the ISG or BISG at a speed while the transmission output shaft is locked at zero speed, applying or closing the transmission shifting element may transfer torque from the ISG or BISG to the locked transmission output shaft so that torque transferred through the transmission shifting element may be determined. The transmission output shaft may be locked by placing the transmission in park or applying wheel brakes. Method 800 proceeds to 810.

At 810, method 600 closes the transmission input clutch and then applies one of the transmission's shifting elements a predetermined amount. In one example, a position of a shifting fork is adjusted in response to a desired transmission shifting element torque (e.g., an amount of torque the shifting element may transfer at a given shifting fork position). The shifting fork adjusts a position of the synchronizer, its friction element, and teeth. The desired transmission shifting element torque may be based on a transfer function or shifting profile stored in controller non-transitory memory, and the transmission shifting element may be adjusted to a position responsive to a transfer function that relates desired transmission shifting element torque to transmission shifting fork position. For example, a table or function stored in non-transitory or transitory memory may hold transmission shifting fork positions, and the table or function may output a transmission shifting element position in response to a desired transmission shifting element torque that references or indexes the table or function. The table or function may store a plurality of transmission shifting fork positions that may be individually referenced by different desired transmission shifting element torque values. The transmission shifting fork may be adjusted to each of the transmission shifting fork positions to correct and/or verify that the transmission shifting element is transferring the amount of torque in the table or function corresponding to each transmission shifting fork positions. Method 800 commands the transmission shifting forks to one of the positions in the table or function after the transmission input clutch is fully closed then method 800 proceeds to 812.

It should be noted that other transmission shifting elements, such as brake bands, may be adjusted in a similar way to characterize their operation. For example, servos may be commanded to positions in tables or functions to provide desired brake band torque amounts. The brake band torque amount may be estimated via ISG or BISG torque so that the function or table describing brake band torque operation may be adjusted or adapted.

At 812, method 800 determines an amount of torque transferred via the transmission shifting element to the transmission output shaft. In one example, method 800 determines a change in the ISG or BISG torque by subtracting ISG or BISG torque at a time immediately before applying the transmission shifting element from ISG or BISG torque immediately after applying the transmission shifting element to a position that is supposed to provide the desired transmission shifting element torque and transmission shifting element position stabilizes (e.g., changes by less than 5%). The ISG or BISG torque before the transmission shifting element is applied and the torque after the transmission shifting element is applied may be determined in response to ISG or BISG current. For example, a current of 0.5 amperes may correspond to an ISG or BISG torque of 10 N-m. Method determines the change in ISG or BISG current by subtracting the ISG or BISG current before applying the transmission shifting element from the ISG or BISG current after applying the transmission shifting element. The change in ISG or BISG torque is the amount of torque transferred by the transmission shifting element since the transmission input clutch is fully closed. If the amount of torque transferred by the transmission shifting element as determined from ISG or BISG current does not equal the value in the table or function (e.g., the transmission input clutch transfer function), the value in the table that corresponds to the transmission shifting element's present position is revised with the torque determined from the ISG or BISG current. For example, if the transmission shifting element is applied by moving shifting forks to a position three millimeters from a non-applied position that is supposed to have a transmission shifting element torque value of 4 N-m, but ISG torque or BISG torque as determined from ISG or BISG current indicates 3 N-m of torque transferred via the transmission shifting element, then the table or function in memory updates the three millimeter position in the table or function with a value of 3 N-m. Method 800 proceeds to 814 after applying the transmission input clutch to a specified position.

At 814, method 800 judges whether or not all values in the function or table describing operation of the transmission shifting element (e.g., the transmission input clutch transfer function) have been corrected or verified. For example, if the function or table includes four pairs of values describing transmission shifting element operation and three of the pairs of values have been corrected or verified, the answer is no and method 800 proceeds to 820. However, if four pairs of values have been corrected or verified, the answer is yes and method 800 proceeds to 816.

At 820, method 800 adjusts the position of the transmission shifting element to a new position, the new position may be a position included in the table or function that describes transmission shifting element torque responsive to transmission fork position. For example, if the function or table includes a transmission shift fork position of 5 mm and a position of 7 mm, and if the transmission shifting fork has already been moved to the 5 mm position, then the transmission shifting fork is moved to the 7 mm position. Method 800 returns to 812.

It should be mentioned that if vehicle operating conditions cause method 800 to exit without having adapted, adjusted, or verified all positions in the table or function describing transmission shifting element operation, method 800 may resume adapting values in the table or function at a later time beginning with values in the table or function that were not previously adjusted or verified. Additionally, method 800 may be performed for each shifting element in the transmission.

At 816, method 800 operates the transmission input clutch according to the table or function that describes transmission shifting element operation, including any values that may have been adjusted. For example, if it is desired that the transmission shifting element transfer 5 N-m of torque, a transmission shifting fork is adjusted to a positon that corresponds to the transmission shifting element being able to transfer 5 N-m of torque. Method 800 proceeds to exit.

In this way, operation and control of the transmission shifting elements may be adjusted and the values that describe transmission shifting element operation in a table or function may be revised as the vehicle and the transmission ages. Each of the transmission shifting elements may have a separate function or table that describes their operation and method 800 may be the basis for adjusting functions or tables for each of the transmission shifting elements.

Referring now to FIG. 9, a prophetic transmission shifting element torque characterization sequence according to the method of FIG. 8 is shown. The sequence of FIG. 9 may be provided via the method of FIG. 8 operating in conjunction with the system of FIGS. 1A-3B. The data in the plots of FIG. 9 occur at the same time and the plots are aligned in time. Vertical markers at times T20-T25 represent times of interest during the sequence.

The first plot from the top of FIG. 9 is a plot of transmission shift element characterization state versus time. The transmission shift element characterization state is active when trace 902 is at a higher level near the vertical axis arrow. The transmission shift element characterization state is not active when trace 902 is at a lower level near the vertical axis arrow. The horizontal axis represents time and time increases from the left side of the figure to the right side of the figure.

The second plot from the top of FIG. 9 is a plot of ISG or BISG torque versus time. The vertical axis represents ISG or BISG torque and ISG or BISG torque increases in the direction of the vertical axis arrow. The horizontal axis represents time and time increases from the left side of the figure to the right side of the figure.

The third plot from the top of FIG. 9 is a plot of transmission shifting element torque (e.g., an amount of torque the transmission shifting element may transfer as presently applied) versus time. The vertical axis represents transmission shifting element torque and transmission shifting element torque increases in the direction of the vertical axis arrow. The horizontal axis represents time and time increases from the left side of the figure to the right side of the figure.

At time T20, the transmission shifting element torque characterization state is not asserted so transmission shifting element positioning is not being requested to be determined and revised. The ISG or BISG torque is a lower level. The transmission shifting element torque is zero indicating that the transmission shifting element is fully open and/or not applied.

At time T21, the transmission shifting element torque characterization state changes from a low value to a high value to request characterization of transmission shifting element torque. The BISG or ISG torque value remains at its previous level. Further, the transmission shifting element torque remains at zero. The ISG or BISG is placed in a speed control mode. The transmission output shaft is lock via applying vehicle brakes or engaging the parking pawl (not shown).

Between time T21 and time T22, the ISG or BISG torque is determined from ISG or BISG electrical current and stored to memory. The ISG or BISG torque remains constant and the transmission shifting element torque characterization state remains asserted.

At time T22, the transmission shifting element torque is increased in a step-wise manner so that the transmission shifting element begins to transfer torque to the transmission case or vehicle wheels. The transmission shifting element torque may be increased via adjusting a position of shifting forks and the transmission shifting element. The ISG or BISG torque increases to maintain ISG or BISG speed and engine speed. The transmission shifting element torque characterization state remains asserted. The BISG or ISG torque change is compared to the commanded transmission shifting element torque change, if there is a difference, the table or function describing transmission shifting element operation is revised with the torque determined via the BISG or ISG (not shown).

At time T23, the transmission shifting element torque is increased a second time in a step-wise manner. Further, the ISG or BISG torque is increased in a step-wise manner to maintain engine and ISG or BISG speed. The transmission shifting element torque characterization state remains asserted.

At time T24, the transmission shifting element torque is decreased to zero in a step-wise fashion and the BISG or ISG torque is decreased in response to the decrease in transmission shifting element torque being reduced so that engine and ISG speed may be maintained.

At time T25, the transmission shifting element torque characterization state transitions to a low state to indicate that transmission shifting element torque characterization is not being performed. The transmission shifting element torque value also remains at zero.

In this way, transmission shifting element operation may be characterized and a transfer function describing transmission shifting element operation may be adapted or adjusted. The transmission shifting element transfer function may be adjusted as the vehicle ages so that the vehicle continues to shift consistently over time.

Thus, the methods of FIGS. 4, 6, and 8 provide for a powertrain operating method, comprising: at least partially engaging a gear synchronizer or a band brake while rotating a transmission input shaft via an electric machine, a transmission output shaft held stopped while rotating the transmission input shaft via the electric machine; and adjusting transmission shifting in response to a torque transferred via the gear synchronizer or the band brake. The method includes where the synchronizer is included in a dual clutch transmission. The method includes where the band brake is included in a transmission that includes a planetary gear set.

In some examples, the method further comprises operating the electric machine in a speed control mode where the electric machine follows a desired speed. The method includes where the torque transferred via the gear synchronizer or band brake is based on current supplied to the electric machine while at least partially engaging the gear synchronizer or band brake while rotating the transmission input shaft via the electric machine. The method includes where the transmission output shaft is held stopped while rotating the transmission input shaft via wheel brakes. The method includes where the transmission output shaft is held stopped via a parking pawl.

The methods of FIGS. 4, 6, and 8 also provide for a powertrain operating method, comprising: rotating a first side of a transmission input clutch via a first electric machine at a first speed while a transmission output shaft is rotated at a second speed via a second electric machine; at least partially engaging the transmission input clutch; and adjusting transmission shifting in response to a torque transferred via the transmission input clutch. The method further comprises operating the first electric machine in a speed control mode while rotating the first side of the transmission input clutch via the first electric machine. The method further comprises adjusting a transfer function that describes operation of the transmission input clutch in response to a change in torque of the first electric machine while the first electric machine is operated in the speed control mode.

In some examples, the method further comprises operating the second electric machine in a speed control mode and maintaining vehicle speed in response to increasing torque transferred via the transmission input clutch. The method further comprises operating an engine at a constant torque while rotating the first side of the transmission input clutch via the first electric machine. The method includes where the first speed is greater than the second speed multiplied by a ratio of an engaged gear of a transmission. The method includes where the first speed is less than the second speed multiplied by a ratio of an engaged gear of a transmission.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A powertrain operating method, comprising:
   at least partially engaging a gear synchronizer or a band while rotating a transmission input shaft via an electric machine, a transmission output shaft held stopped while rotating the transmission input shaft via the electric machine, including commanding an increased torque transferred by the gear synchronizer or the band and increasing electric machine torque; and
   adjusting transmission shifting in response to a torque transferred via the gear synchronizer or the band, including updating a characterization of the gear synchronizer or the band based on a comparison of electric machine torque increase to the commanded gear synchronizer or a band torque increase.

2. The method of claim 1, where the gear synchronizer is included in a dual clutch transmission.

3. The method of claim 1, where the band is included in a transmission that includes a planetary gear set.

4. The method of claim 1, further comprising operating the electric machine in a speed control mode where the electric machine follows a desired speed, even with the increased torque.

5. The method of claim 4, where the torque transferred via the gear synchronizer or the band is based on current supplied to the electric machine while at least partially engaging the gear synchronizer or the band while rotating the transmission input shaft via the electric machine.

6. The method of claim 1, where the transmission output shaft is held stopped while rotating the transmission input shaft via wheel brakes.

7. The method of claim 1, where the transmission output shaft is held stopped via a parking pawl.

8. The method of claim 1 wherein updating a characterization of the gear synchronizer or the band includes updating values in a table or function that describe gear synchronizer or band operation in a controller as the transmission ages.

* * * * *